United States Patent
Solheid et al.

(10) Patent No.: US 11,428,888 B2
(45) Date of Patent: Aug. 30, 2022

(54) CABLE FAN-OUT ARRANGEMENTS AND METHODS THEREFORE

(71) Applicant: COMMSCOPE TECHNOLOGIES LLC, Hickory, NC (US)

(72) Inventors: James J. Solheid, Minneapolis, MN (US); Matthew J. Holmberg, Minneapolis, MN (US); Oscar Fernando Bran De León, Belle Plaine, MN (US); Scott C. Sievers, Jordan, MN (US); David P. Percival, Tabernash, CO (US); Jennifer Lynn Miller, Farmington, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/044,024

(22) PCT Filed: Mar. 29, 2019

(86) PCT No.: PCT/US2019/024810
§ 371 (c)(1),
(2) Date: Sep. 30, 2020

(87) PCT Pub. No.: WO2019/191570
PCT Pub. Date: Oct. 3, 2019

(65) Prior Publication Data
US 2021/0124140 A1      Apr. 29, 2021

Related U.S. Application Data

(60) Provisional application No. 62/650,524, filed on Mar. 30, 2018.

(51) Int. Cl.
*G02B 6/44* (2006.01)

(52) U.S. Cl.
CPC ......... *G02B 6/4472* (2013.01); *G02B 6/4471* (2013.01)

(58) Field of Classification Search
None
See application file for complete search history.

(56) References Cited

U.S. PATENT DOCUMENTS 4,288,107 A * 9/1981 Schwartze ............. F16L 47/22
  285/123.2
7,418,186 B1 * 8/2008 Grubish ............... G02B 6/4477
  385/135

(Continued)

FOREIGN PATENT DOCUMENTS

CN       102129103 A      7/2011
WO    WO-2006065574 A2 *  6/2006  ........... G02B 6/4471

(Continued)

OTHER PUBLICATIONS

International Search Report and Written Opinion of the International Searching Authority for International Patent Application No. PCT/US2019/024810 dated Aug. 9, 2019, 16 pages.

(Continued)

*Primary Examiner* — Michelle R Connelly
(74) *Attorney, Agent, or Firm* — Merchant & Gould P.C.

(57) ABSTRACT

A fanout arrangement includes a fanout body; a mesh sleeve; and an arrangement to hold the mesh sleeve to the fanout body. The fanout body may have one or more removable sheath organizers to retain the upjacketing for the fanned out optical fibers.

19 Claims, 20 Drawing Sheets

(56) References Cited

U.S. PATENT DOCUMENTS

| | | | |
|---|---|---|---|
| 8,824,850 B2* | 9/2014 | Garcia | G02B 6/4471 385/135 |
| 9,244,243 B2 | 1/2016 | Mullaney et al. | |
| 9,448,365 B2 | 9/2016 | Fletcher | |
| 9,739,952 B2 | 8/2017 | Fletcher | |
| 10,175,430 B2* | 1/2019 | Levy | G02B 6/3885 |
| 10,890,730 B2* | 1/2021 | Petersen | G02B 6/4439 |
| 10,948,677 B2* | 3/2021 | Van Der Meulen | G02B 6/38 |
| 2002/0141724 A1* | 10/2002 | Ogawa | G02B 6/4472 385/137 |
| 2005/0029004 A1* | 2/2005 | Robinson | G02B 6/4471 174/72 A |
| 2005/0031276 A1 | 2/2005 | Zimmel et al. | |
| 2011/0182558 A1* | 7/2011 | Garcia | G02B 6/3887 385/135 |
| 2014/0140664 A1 | 5/2014 | Islam | |
| 2015/0093084 A1* | 4/2015 | Cooke | G02B 6/4471 385/113 |
| 2015/0370029 A1 | 12/2015 | Petersen et al. | |
| 2016/0202438 A1 | 7/2016 | Bustamante | |
| 2016/0202441 A1 | 7/2016 | Claessens et al. | |
| 2017/0322380 A1* | 11/2017 | Levy | G02B 6/3885 |
| 2018/0149823 A1* | 5/2018 | Wang | G02B 6/4471 |

FOREIGN PATENT DOCUMENTS

| | | |
|---|---|---|
| WO | 2011/088613 A1 | 7/2011 |
| WO | 2017/046190 A2 | 3/2017 |
| WO | 2017/161310 A1 | 9/2017 |
| WO | 2018/195109 A1 | 10/2018 |

OTHER PUBLICATIONS

Extended European Search Report for European Patent Application No. 19777598.4 dated Nov. 5, 2021, 9 pages.

Chinese Second Office Action for Application No. 201980016904.4 dated Mar. 10, 2022).

* cited by examiner

CABLE FAN-OUT ARRANGEMENTS AND METHODS THEREFORE

CROSS-REFERENCE TO RELATED APPLICATION

This application is a National Stage Application of PCT/US2019/024810, filed on Mar. 29, 2019, which claims the benefit of U.S. Patent Application Ser. No. 62/650,524, filed on Mar. 30, 2018, the disclosures of which are incorporated herein by reference in their entireties. To the extent appropriate, a claim of priority is made to each of the above disclosed applications.

BACKGROUND

In general, a cable fanout is a component at which optical fibers of a cable are separated into two or more groups of one or more fibers. In certain types of cable fanouts, the optical fibers can be upjacketed (i.e., disposed within sheaths) to protect the fibers. The various upjacketed fibers can be routed away from fanout in different directions. Typically, the optical fibers and upjacketing are potted at the fanout using epoxy.

Improvements are required.

SUMMARY

Some aspects of the disclosure are directed to various types of cable fanout arrangements and methods of assembly thereof. In certain examples, the optical fibers are separated into multiple groups of ribbonized optical fibers. Each of the groups is upjacketed (e.g., threaded into a sheath) as the group exits the component.

A mesh sleeve can be mounted about the upjacketed groups of fibers to protect the fibers along a fiber routing path. In certain examples, a chassis clamp can be mounted to an opposite end of the mesh sleeve from the cable fanout. The chassis clamp is configured to easily snap-fit the mesh sleeve, and hence the upjacketed groups of fibers, to a chassis.

In certain examples, multiple mesh sleeves can be mounted at the fanout with each mesh sleeve protecting some of the upjacketed groups of fibers. A respective chassis clamp can be mounted to the opposite end of one or more of the mesh sleeves.

The mesh sleeve is retained at the fanout body. In certain examples, the mesh sleeve has an edge external of the fanout body. In some implementations, a sleeve retainer arrangement holds the mesh sleeve to the fanout body. In certain examples, the sleeve retainer arrangement includes teeth that engage the mesh sleeve. In other implementations, the mesh sleeve is retained at the fanout body with a thermally responsive sleeve arrangement. In certain examples, the thermally responsive sleeve arrangement includes three adhesively lined thermally responsive sleeves.

In certain implementations, the fanout body includes one or more sheath organizers at which the sheaths (i.e., the upjacketing) are held. In certain examples, the sheath organizers are removable from the fanout. The upjacketed groups of fibers can be mounted within the sheath organizers external of the fanout body. Accordingly, the sheath organizers of a single fanout body can be moved to separate workstations to be assembled simultaneously, thereby reducing manufacturing time and increasing efficiency.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
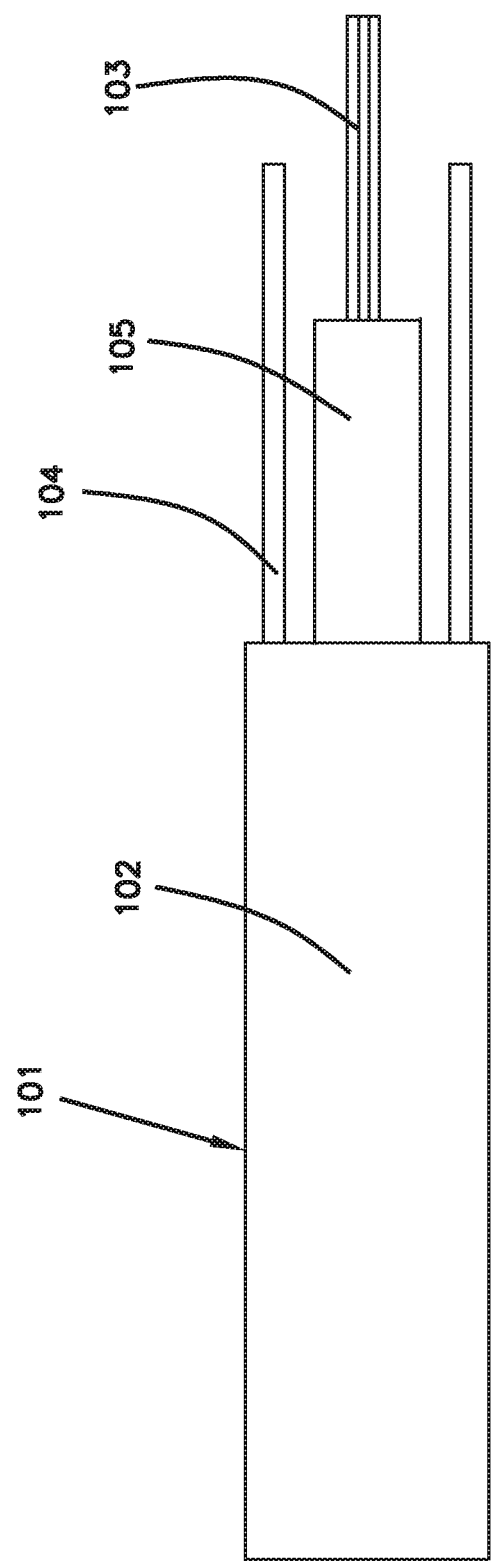
FIG. 1 is a top plan view of an example cable that can be fanned out using any of the cable fanout arrangements described herein.
Figure 2:
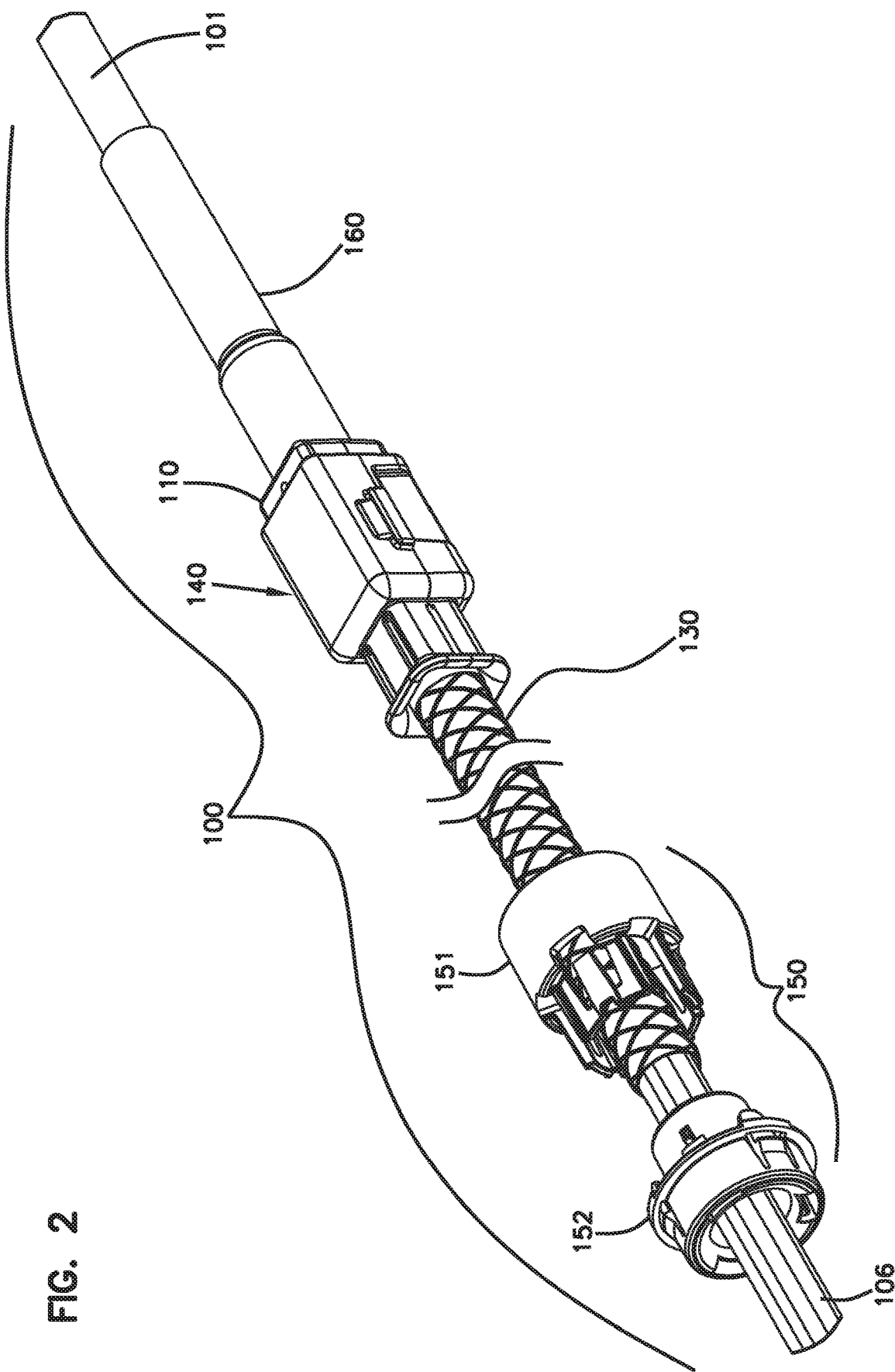
FIG. 2 is a perspective view of a first example cable fanout arrangement suitable for use in fanning out an optical cable, such as the optical cable of FIG. 1.

The present disclosure is directed various types of cable fanout arrangements and methods for assembling the cable fanout arrangements. FIG. 1 illustrates an example cable 101 to be fanned out. The cable 101 includes a jacket or outer tubing 102 and a plurality of optical fibers 103. In certain examples, the optical fibers are disposed within a central tube 105. In some examples, the optical fibers 103 are arranged in a plurality of ribbons. In other examples, the optical fibers 103 are loose. In certain implementations, the cable 101 includes at least one strength member 104 (e.g., aramid yarn, GRP rods, etc.).

FIGS. 2-6 illustrate a first example fanout arrangement 100 suitable for use in fanning out a cable 101. FIGS. 7-16 illustrate a second example fanout arrangement 200 suitable for use in fanning out a cable 101. FIGS. 17-20 illustrate a third example fanout arrangement 300 suitable for use in fanning out a cable 101. Each of the fanout arrangements 100, 200, 300 includes a fanout body 110, 210, 310 that receives the cable 101 at a first end and retains a plurality of sheaths 106 extending out of the fanout body 110, 210, 310 at a second end. The sheaths 106 protect the optical fibers 103 as the optical fibers exit the fanout body 110, 210, 310.

Each fanout body 110, 210, 310 extends along a length between a first end (i.e., rear) 112, 212, 312 and a second end (i.e., front) 113, 213, 313. The first end 112, 212, 312 is configured to receive a jacketed portion of the cable 101. In certain examples, the fanout body 110, 210, 310 defines a tubular sleeve 115, 215, 315 through which the cable 101 extends. Each fanout body 110, 210, 310 also includes a separation region defining an interior 114, 214, 314. The tubular sleeve 115, 215, 315 leads from the first end 112, 212, 312 to the interior 114, 214, 314. In certain examples, a shrinkable tube 160 (e.g., a thermally responsive tube, an elastic tube, etc.) fits over the tubular sleeve 115, 215, 315 and over a portion of the jacketed portion of the cable 101 to secure the fanout body 110, 210, 310 to the cable 101. The optical fibers 103 extend out of the jacketed portion of the cable within the interior.

In some implementations, the fanout body 110, 210 includes a base 111, 211 and a cover 118, 218 that cooperate to define an interior. In certain examples, the cover 118, 218 snap-fits to the base 111, 211. For example, one of the base and cover may include latching arms 119, 219 and the other of the base and cover may include a latching shoulder or other latching receiver to which the latching arms 119, 219 attach. In other implementations, the fanout body 310 may be potted with epoxy instead of attaching a cover. In certain examples, the epoxy may fill an interior of the fanout body 310.

Figure 3:
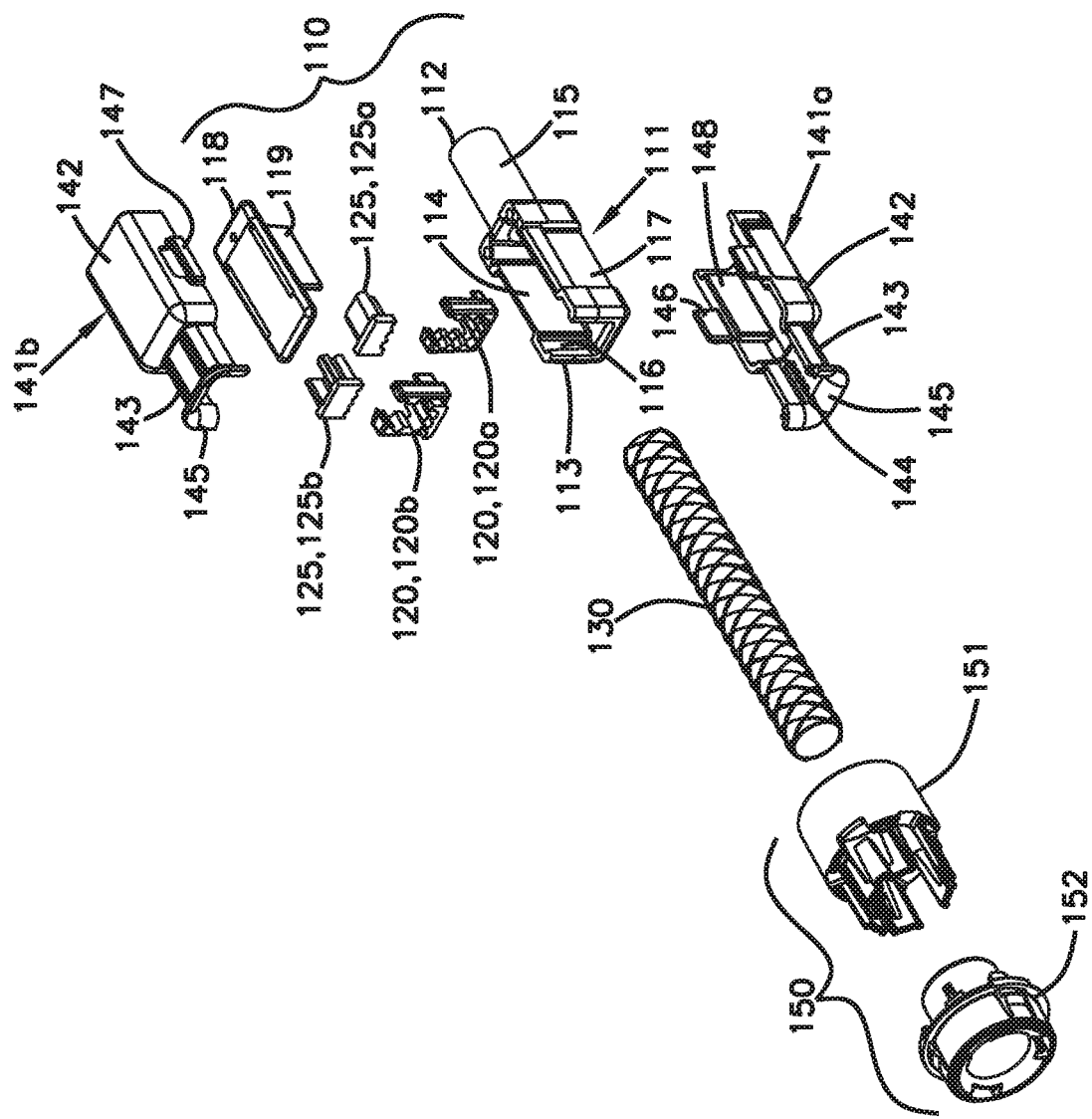
FIG. 3 is a perspective view of the cable fanout arrangement of FIG. 2 with the components exploded away from each other for ease in viewing.
Figure 7:
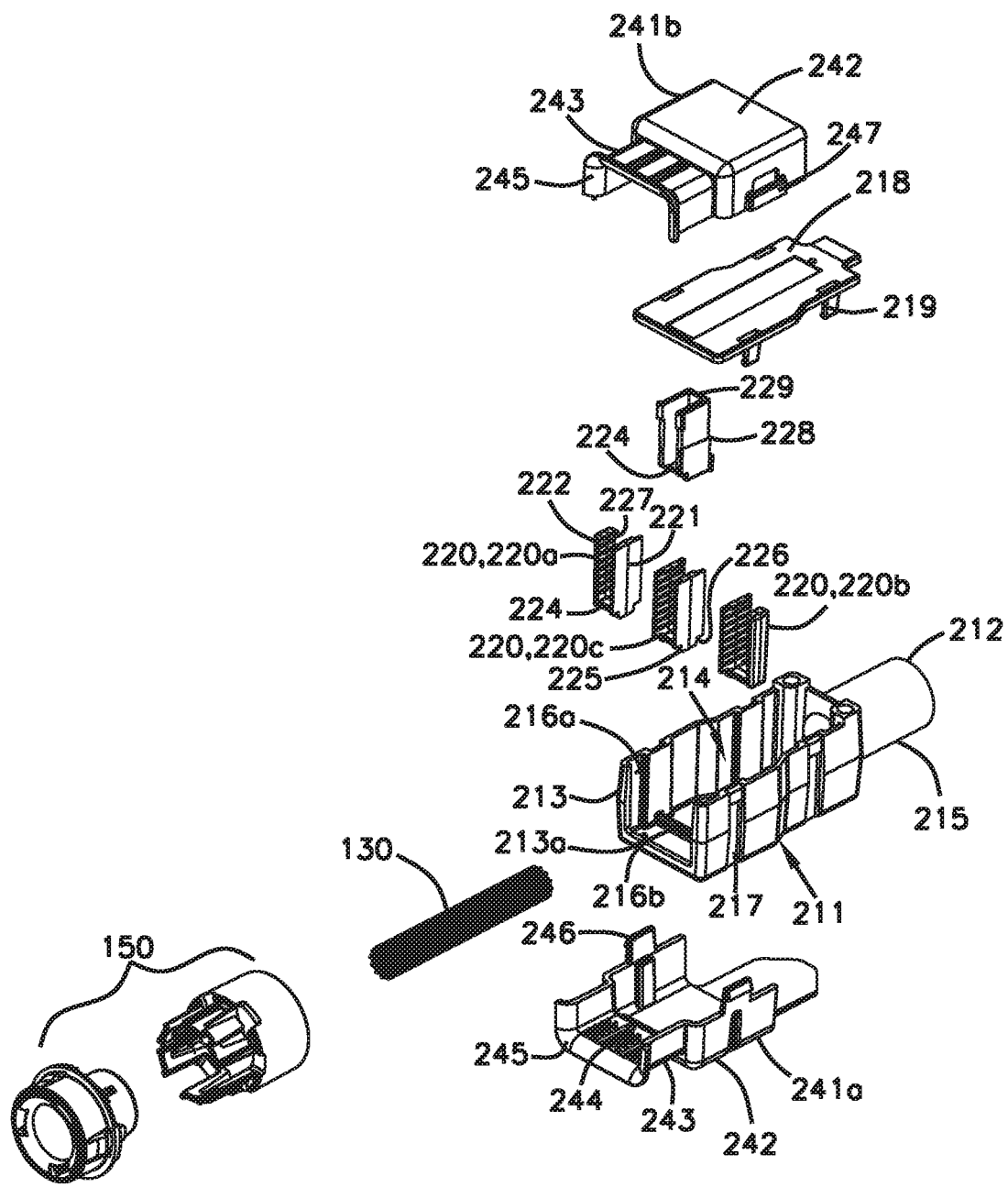
FIG. 7 is a perspective view of possible components of a second example cable fanout arrangement suitable for use in fanning out an optical cable, such as the optical cable of FIG. 1, where the components of the cable fanout arrangement are exploded away from each other for ease in viewing.
Figure 8:
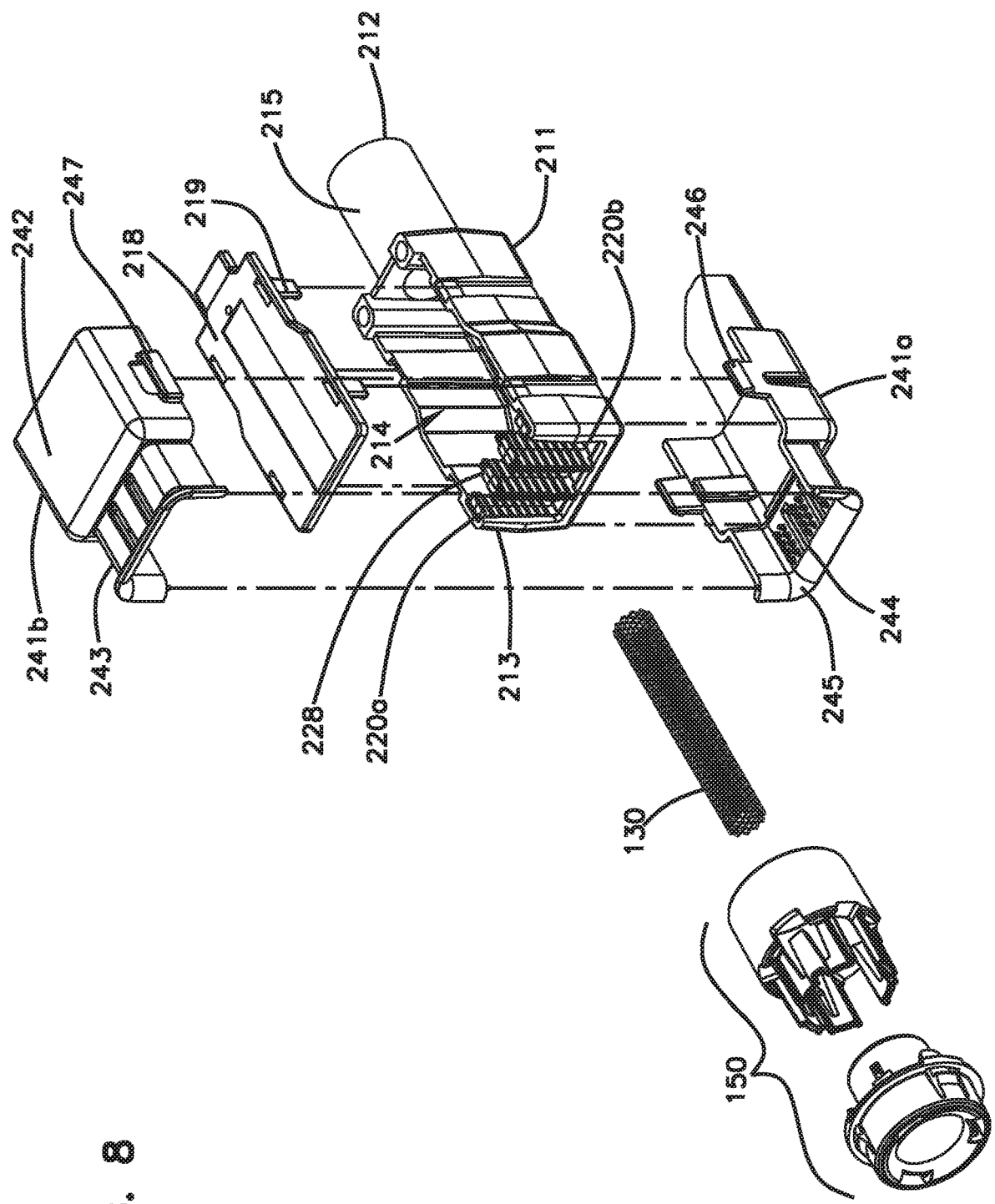
FIG. 8 is a perspective view of the second cable fanout arrangement of FIG. 7 showing a separator being positioned between first and second sheath organizers within the fanout body.

As will be discussed in more detail herein, some example fanout bodies 110, 210 include one or more removable sheath organizers 120, 220 that mount at the second ends 113, 213 of the fanout bodies 110, 210 (see FIGS. 3 and 7). In certain implementations, each of the sheath organizers 120, 220 define a plurality of channels into which the sheaths 106 can slot. In certain implementations, each sheath organizer 120, 220 is configured to hold the sheaths 106 in one or more rows. In certain implementations, each sheath organizer 120, 220 is configured to hold the sheaths 106 in one or more columns. In certain implementations, each sheath organizer 120, 220 is configured to hold the sheaths 106 in offset layers. Other example fanout bodies 310 do not have removable sheath organizers. Rather, the fanout body 310 includes separators 326 that divide the sheaths 106 into two or more groups (see FIG. 17).

A mesh sleeve 130 can be mounted over some or all of the sheaths 106 extending out from the fanout body 110, 210, 310. In certain examples, multiple mesh sleeves 130 can be coupled to the fanout body 110, 210, 310. The mesh sleeve 130 organizes and/or protects the sheaths 106 within the mesh sleeve 130.

In some implementations, the mesh sleeve 130 couples to the fanout body 110, 210, 310 using a sleeve retainer arrangement 140, 240, 340 that mounts about an exterior of the fanout body 110, 210, 310, respectively. Certain examples of a sleeve retainer arrangement 140, 240, 340 include first and second housing pieces 141a, 141b, 241a, 241b, 341a, 341b that couple together about the fanout body 110, 210, 310 to be axially fixed (i.e., fixed along a length of the cable) relative to the fanout body 110, 210, 310. The housing pieces 141a, 141b, 241a, 241b, 341a, 341b cooperate to engage the mesh sleeve 130 in an axially fixed position relative to the sleeve retainer arrangement 140 and, hence, to the fanout body 110, 210, 310.

In certain implementations, the first and second housing pieces 141a, 141b, 241a, 241b, 341a, 341b snap-fit together. In certain examples, the first housing piece 141a, 241a, 341a latches to the second housing piece 141b, 241b, 341b. In the example shown, the first housing piece 141a, 241a, 341a includes latch arms 146, 246, 346 that snap fit to latch receivers 147, 247, 347 of the second housing piece 141b, 241b, 341b. In other examples, the first and second housing pieces 141a, 141b, 241a, 241b, 341a, 341b can be fastened, welded, glued, heat-staked, or otherwise coupled together.

In certain implementations, the sleeve retainer arrangement 140, 240, 340 includes a first portion 142, 242, 342 and a second portion 143, 243, 343. The first portion 142, 242, 342 is sized and shaped to fit about the fanout body 110, 210, 310. In certain examples, the first portion 142, 242, 342 is configured to engage the fanout body 110, 210, 310 to axially retain the sleeve retainer arrangement 140, 240, 340 relative to the fanout body 110, 210, 310. In some examples, the fanout body 110, 210, 310 defines a recess 117, 217 and at least one of the housing pieces 141a, 141b, 241a, 241b includes an inward protrusion 148, 248 that fits within the recess 117, 217 to axially retain the sleeve retainer arrangement 140, 240 relative to the fanout body 110, 210. In other examples, the housing pieces 341, 341b include partial end walls 348 extending over the first and second ends 312, 313 of the fanout body 310 to axially retain the sleeve arrangement 340 relative to the fanout body 310.

The second portion 143, 243, 343 of the fanout body 110, 210, 310 engages the mesh sleeve 130. In certain examples, the second portion 143, 243, 343 includes one or more teeth 144, 244, 344 that extend into holes in the mesh sleeve 130 to axially retain the mesh sleeve 130 relative to the second portion 143, 243, 343. In the example shown, the first housing piece 141a, 241a, 341a includes two rows of inwardly extending teeth 144, 244, 344. In other examples, the teeth can be arranged in any number of rows or in any configuration. In other examples, both housing pieces can include teeth 144, 244, 344. In certain examples, the second portion 143, 243, 343 also can include a curved end surface 145, 245, 345 (e.g., a trumpet shape, a funnel shape, etc.) to protect the mesh sleeve 130 during flexing/bending movement of the mesh sleeve 130 relative to the fanout body 110, 210, 310.

In some implementations, the fanout arrangement 100, 200, 300 is prepared in a factory or other manufacturing site. In certain such implementations, the sheaths 106 can be potted within the fanout bodies 110, 210, 310 with epoxy (e.g., fully or partially filling the fanout bodies 110, 210, 310). In other implementations, however, the fanout arrangement 100, 200, 300 can be prepared in the field. In such implementations, a field assembler may not have access to the tools needed to fully or partially epoxy an interior of the fanout body 110, 210, 310 once the sheaths 106 are in place. Accordingly, an arrangement 170 of thermally responsive sleeves can be used to secure the sheaths 106 to the fanout body 110, 210, 310 and/or couple the mesh sleeve 130 to the fanout body 110, 210, 310.

Figure 21:
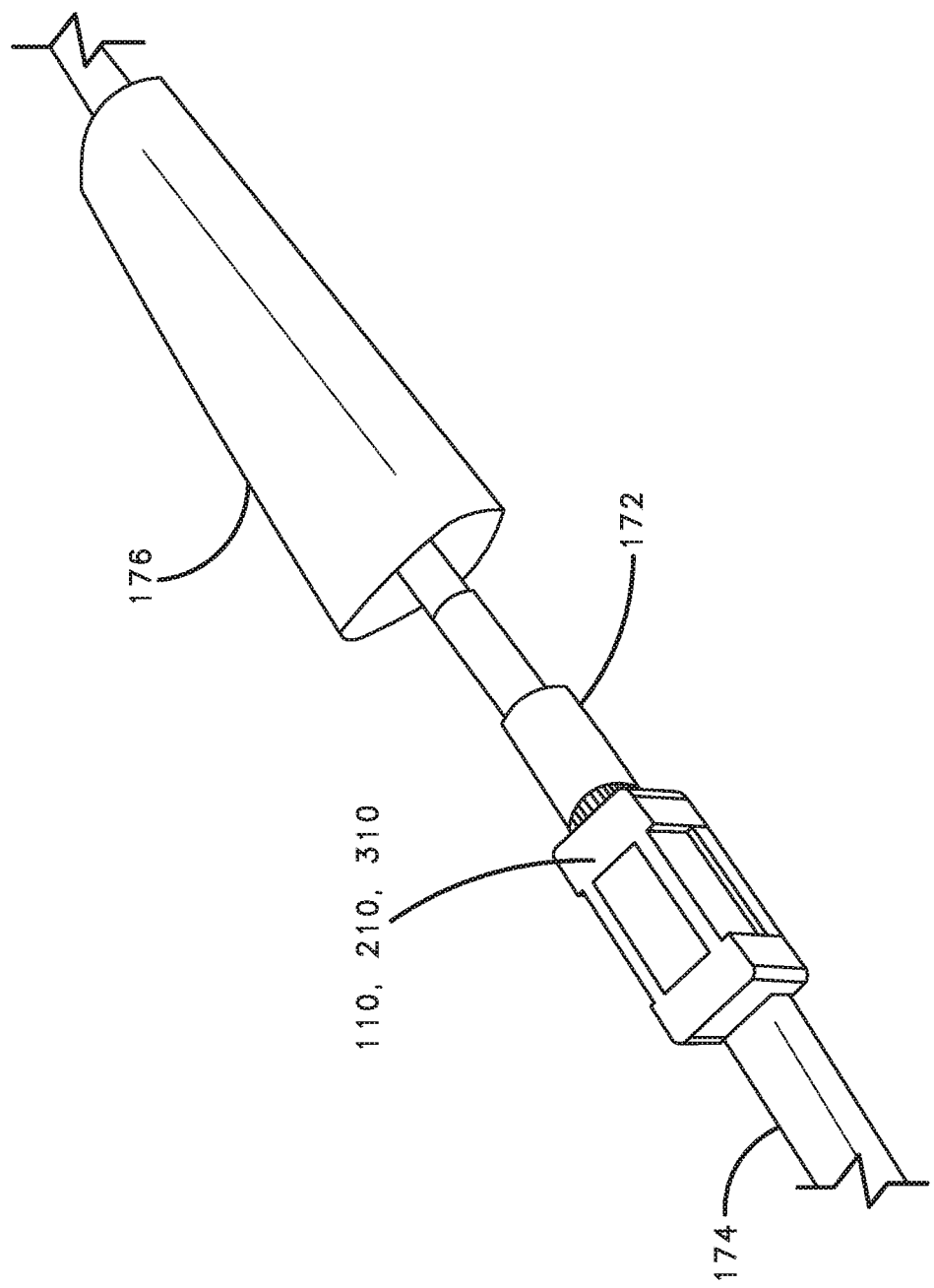
FIGS. 21 and 22 illustrate a shrink tube arrangement being installed over a loaded fanout body to secure a mesh sleeve to the fanout body.

For example, as shown in FIG. 21, a first shrinkable (e.g., thermally responsive, elastic, etc.) sleeve 172 is mounted at the first end 112, 212, 312 of the fanout body 110, 210, 310 to extend over the tubular sleeve 115, 215, 315 and over a section of the jacketed portion of the cable 101. When shrunk, the first shrinkable sleeve 172 aids in axially retaining the fanout body 110, 210, 310 relative to the cable 101.

A second shrinkable sleeve 174 is mounted at the second end 113, 213, 313 of the fanout body 110, 210, 310. In certain examples, the second shrinkable sleeve 174 remains external, but adjacent to the second end 113, 213, 313 of the fanout body 110, 210, 310. The second shrinkable sleeve 174 seals around the mesh sleeve 130 and axially retains the mesh sleeve 130 to the sheaths 106 by radially clamping the mesh sleeve 130 onto the bundle of sheaths 106 within the mesh sleeve 130. In certain examples, a protective sheet (e.g., foil) is wrapped over a portion of the mesh sleeve 130 to protect the mesh sleeve 130 during shrinking of the sleeve 174 (e.g., during application of heat to the sleeve 174).

Figure 22:
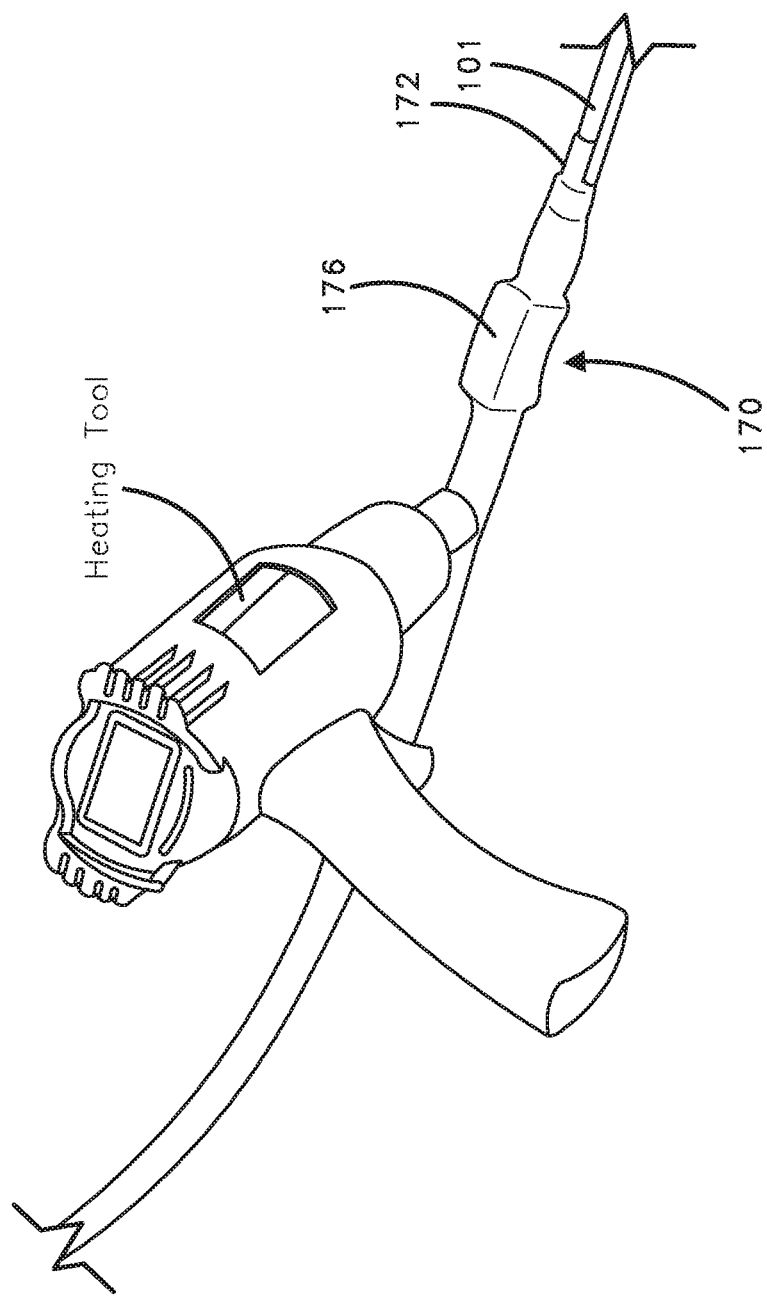

A third shrinkable sleeve 176 is mounted to extend over the fanout body 110, 210, 310 (e.g., see FIG. 22). The third shrinkable sleeve 176 extends partially over the first shrinkable sleeve 172 so that the third shrinkable sleeve 176 seals to the first shrinkable sleeve 172 when shrunk. The third shrinkable sleeve 176 extends partially over the second shrinkable sleeve 172 so that the third shrinkable sleeve 176 seals to the second shrinkable sleeve 172 when shrunk. Accordingly, the shrinkable sleeves 172, 174, 176 cooperate to hold the mesh sleeve 130 in an axially fixed position relative to the fanout body 110, 210, 310 and to the cable 101. In certain examples, one or more of the shrinkable sleeves 172, 174, 176 have adhesive lining to aid in axial retention of the sleeve.

In use, the fanout arrangement 100, 200, 300 can be used in a data center or other location in which the optical fibers 103 of a cable 101 are routed to separate racks or to separate chasses or components on the same rack. In certain implementations, a clamp arrangement 150 can be mounted to the mesh sleeve 130 at an opposite side of the mesh sleeve 130 from the fanout body 110, 210, 310. The clamp arrangement 150 facilitates securing the sheaths 106 to the chassis or other component. The clamp arrangement 150 includes a first body 151 and a second body 152 that clamp the mesh sleeve 130 therebetween. The clamp arrangement 150 includes retention structure to hold the clamp arrangement 150 at an aperture in a chassis or other structure. Further description of an example clamp arrangement 150 suitable for use with the fanout arrangement 100, 200, 300 can be found in U.S. Pat. No. 9,448,365, the disclosure of which is hereby incorporated herein by reference.

Referring now to FIGS. 2-6, the first example fanout arrangement 100 suitable for use in fanning out the cable 101 is shown. The fanout arrangement 100 is configured to accommodate different sizes of cable 101. For example, the fanout arrangement 100 includes different sheath organizers 120 that can be inserted into the fanout body 110 to hold various numbers of sheaths 106 depending on the number of optical fibers 103 of the cable 101 and/or the number of groups into which the fibers 103 should be broken.

In the example shown, the fanout arrangement 100 includes a first sheath organizer 120a and a second sheath organizer 120b. The sheath organizer 120a is configured to hold more sheaths 106 than the sheath organizer 120b. During assembly of the fanout arrangement 100, a user selects one of the sheath organizers 120a, 120b to be inserted within the fanout body 110. In certain examples, the sheaths 106 are mounted to the sheath organizer 120 before inserting the sheath organizer 120 into the fanout body 110.

Figure 4:
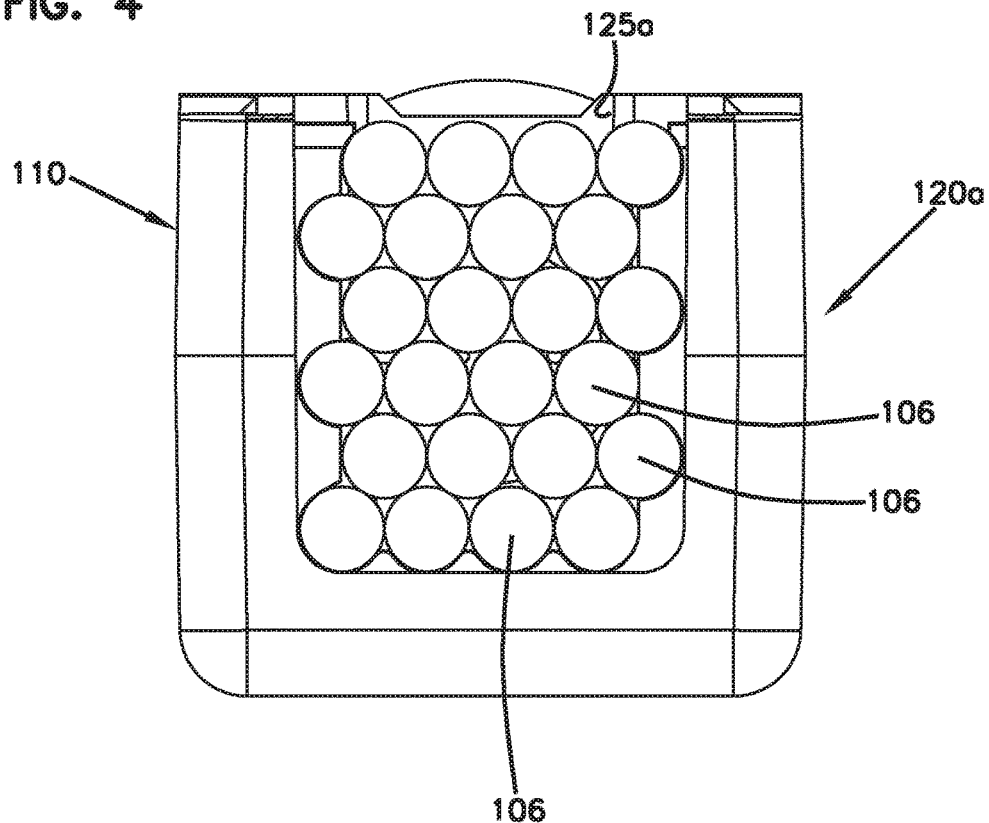
FIG. 4 is a front elevational view of the cable fanout arrangement of FIG. 2 using a first sheath organizer holding a first number of sheaths.
Figure 5:
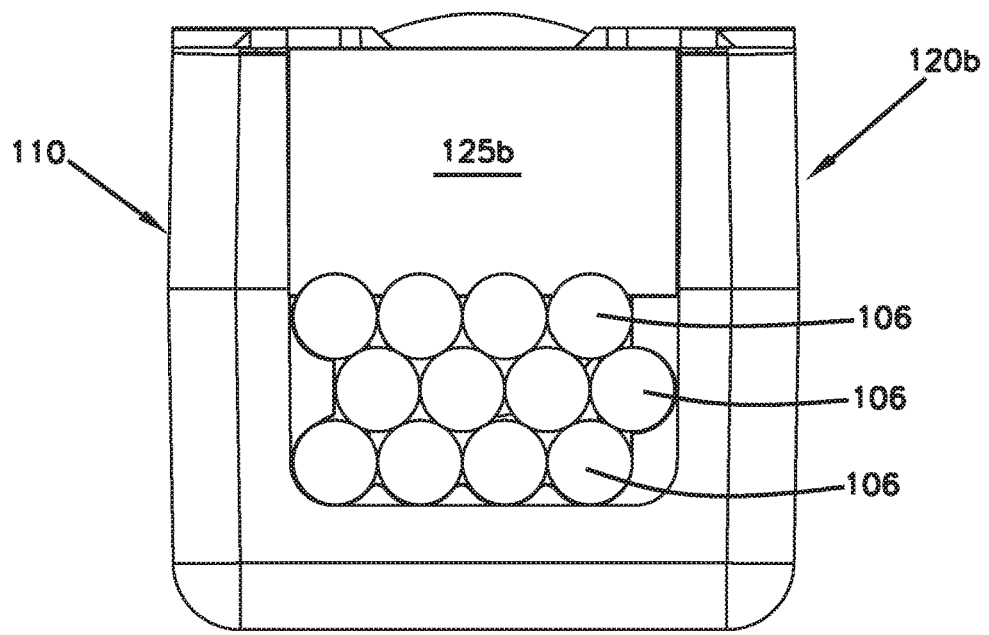
FIG. 5 is a front elevational view of the cable fanout arrangement of FIG. 2 using a second sheath organizer holding a second number of sheaths, the second number being less than the first number.
Figure 6:
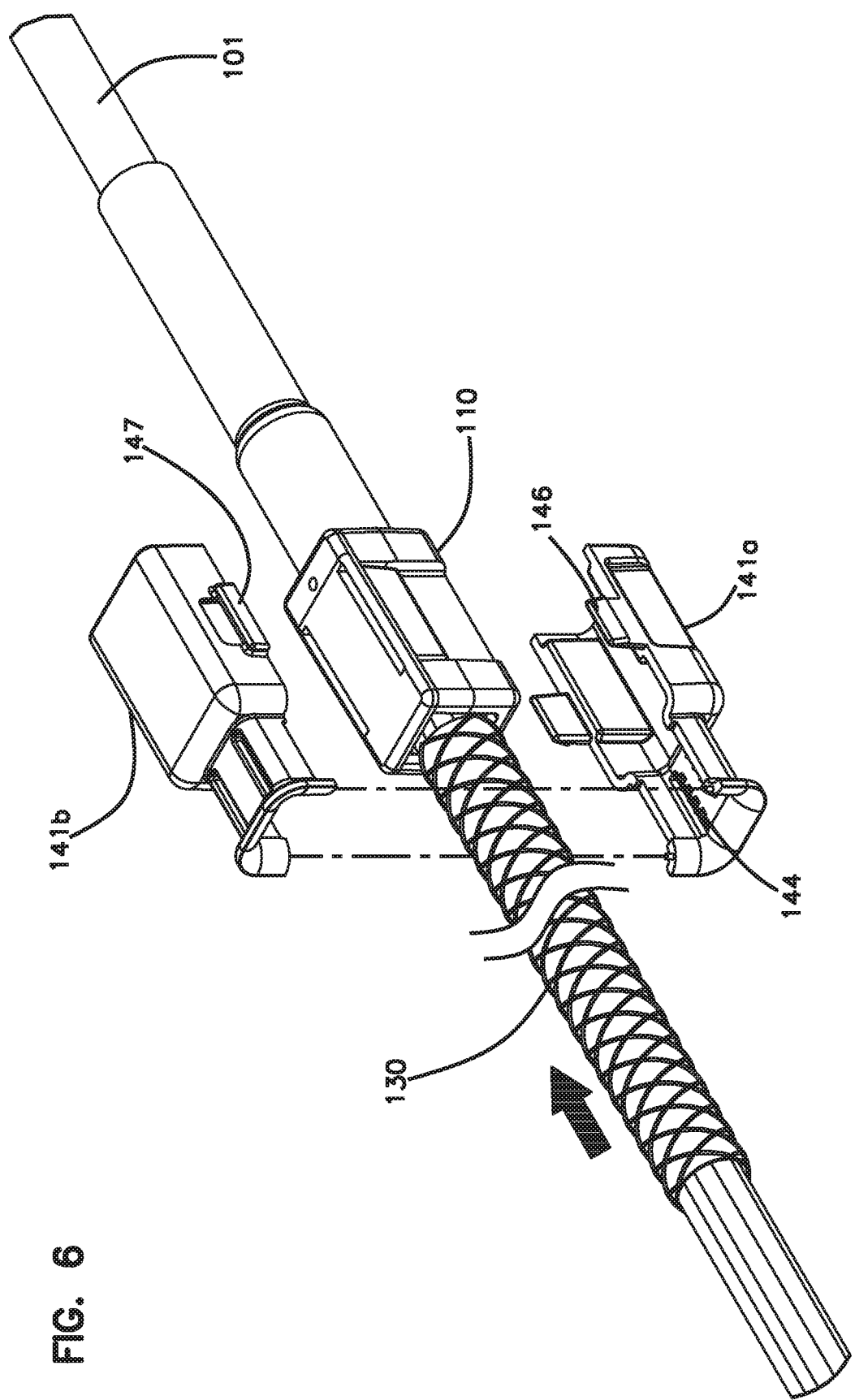
FIG. 6 is a perspective view of the cable fanout arrangement of FIG. 2 with components of a sleeve retention arrangement exploded outwardly for ease in viewing.

FIG. 4 illustrates a front view of the fanout body 110 with the sheaths 106 mounted in the first sheath organizer 120a. FIG. 5 illustrates a front view of the fanout body 110 with the sheaths 106 mounted in the second sheath organizer 120b.

In certain implementations, the sheath organizer 120 includes an organizer cover 125 that mounts to the sheath organizer 120 to aid in retaining the sheaths 106 at the organizer 120. In the example shown, each sheath organizer 120a, 120b has a corresponding organizer cover 125a, 125b that fills the space between the sheaths 106 and a top of the organizer 120. In certain examples, the organizer cover 125 fills the space between the sheaths 106 and a top of the fanout body 110.

FIGS. 7-16 illustrate the second example fanout arrangement 200 suitable for use in fanning out the cable 101. The second fanout arrangement 200 also is configured to accommodate different sizes of cable 101. For example, the second fanout arrangement 200 includes an organizer arrangement of multiple sheath organizers 220 that can be inserted into the fanout body 210 in various configurations depending on the number of optical fibers 103 of the cable 101 and/or the number of groups into which the fibers 103 should be broken.

In certain implementations, the organizer arrangement includes a first sheath organizer 220a and a second sheath organizer 220b that can both be inserted into the fanout body 210. The first sheath organizer 220a holds a first plurality of the sheaths 106 and the second sheath organizer 220b holds a second plurality of the sheaths 106. The second sheath organizer 220b is laterally offset from the first sheath organizer 220a while both sheath organizers 220a, 220b are disposed at the second end 213 of the fanout body 210.

Figure 9:
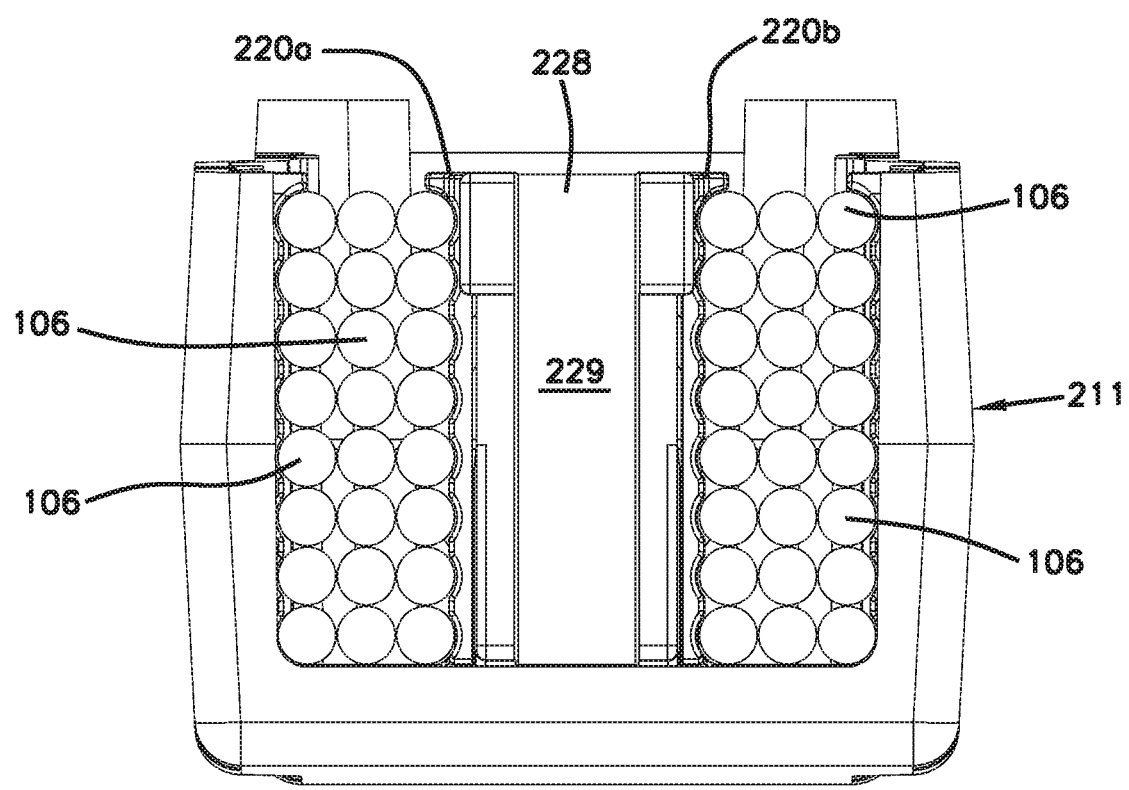
FIG. 9 is a front elevational view of the loaded fanout body of the second cable fanout arrangement of FIG. 8.
Figure 10:
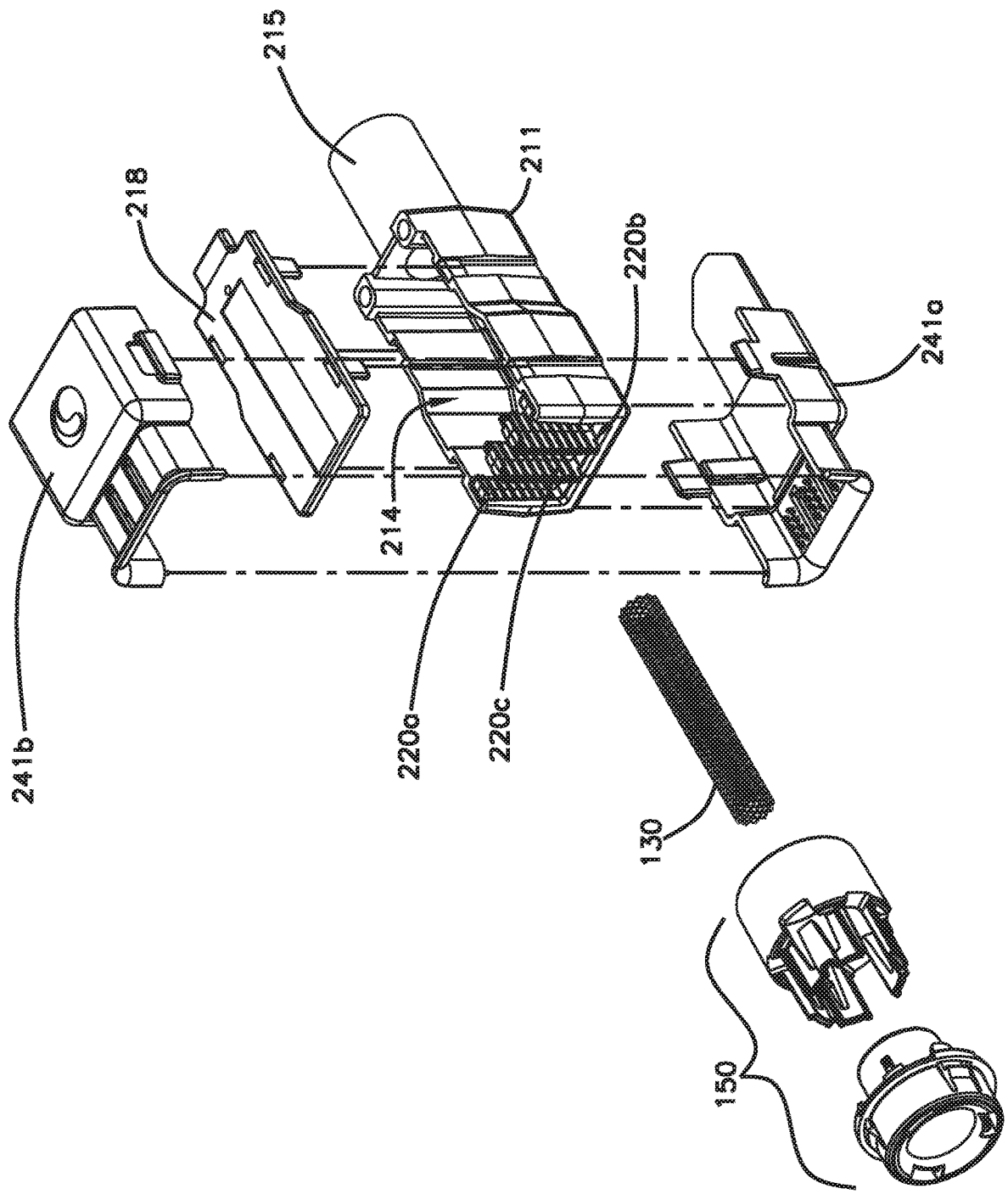
FIG. 10 is a perspective view of the second cable fanout arrangement of FIG. 7 showing a third sheath organizer being positioned between first and second sheath organizers within the fanout body.
Figure 11:
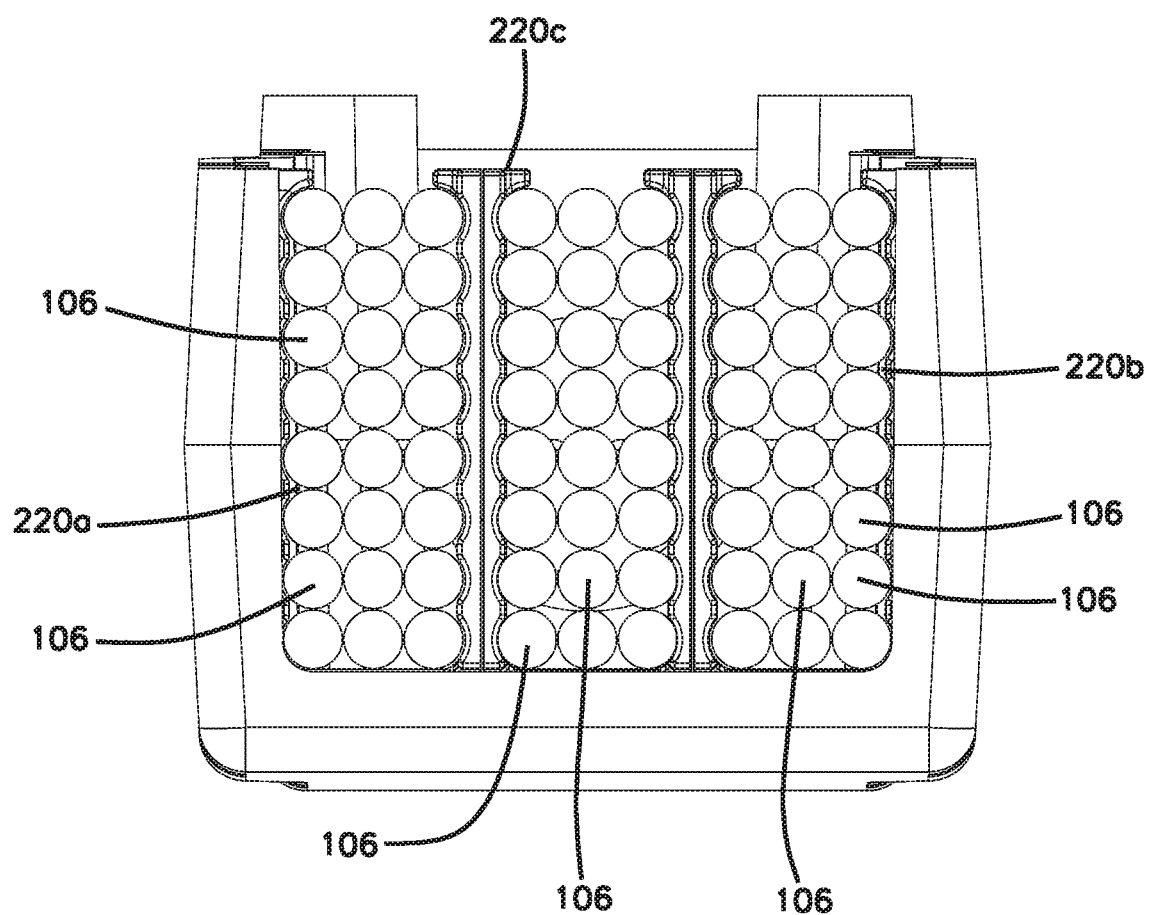
FIG. 11 is a front elevational view of the loaded fanout body of the second cable fanout arrangement of FIG. 10.
Figure 12:
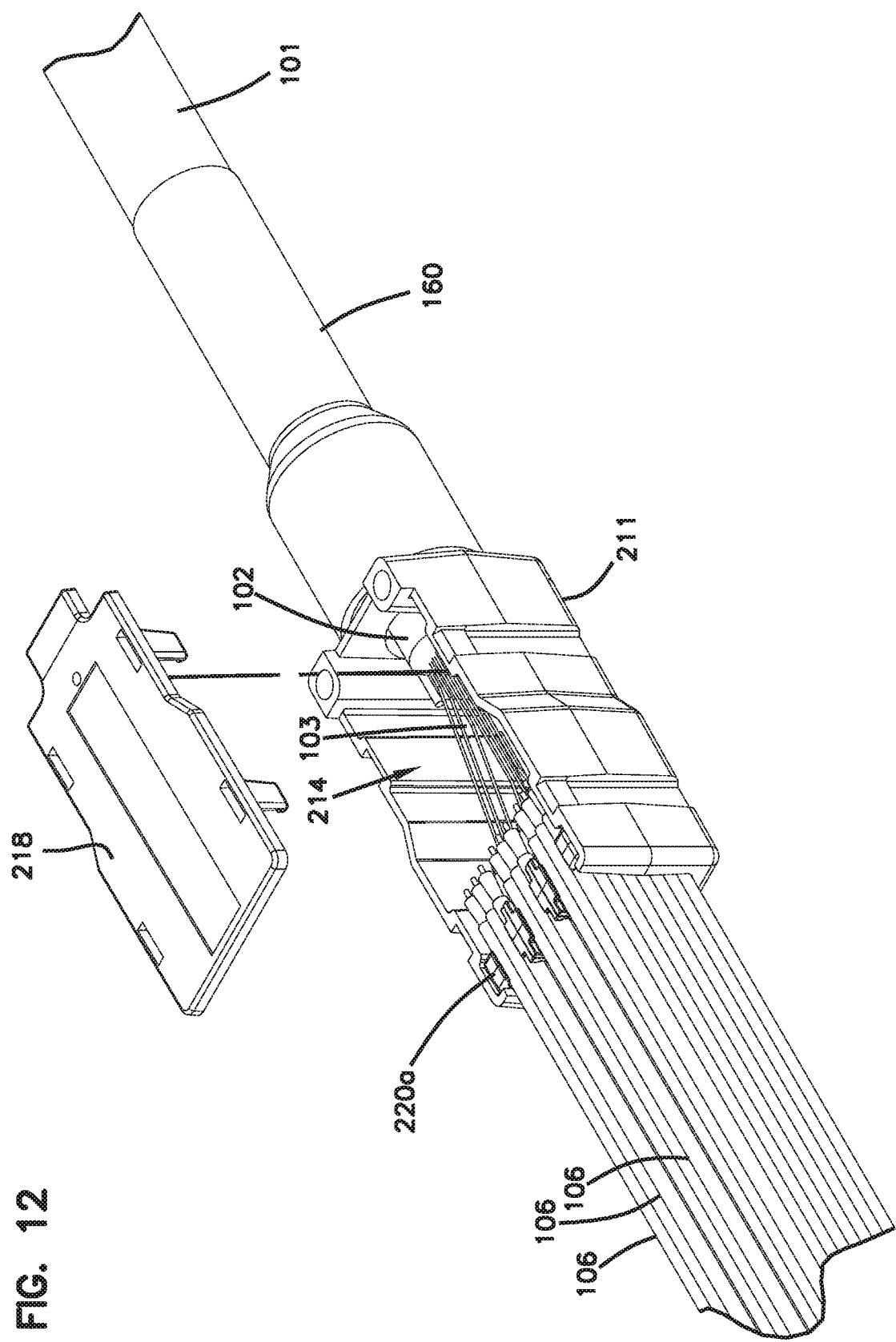
FIG. 12 is a perspective view of a portion of the second cable fanout arrangement of FIG. 10 with a cover exploded from the fanout body to reveal the optical fibers within the fanout body interior.
Figure 13:
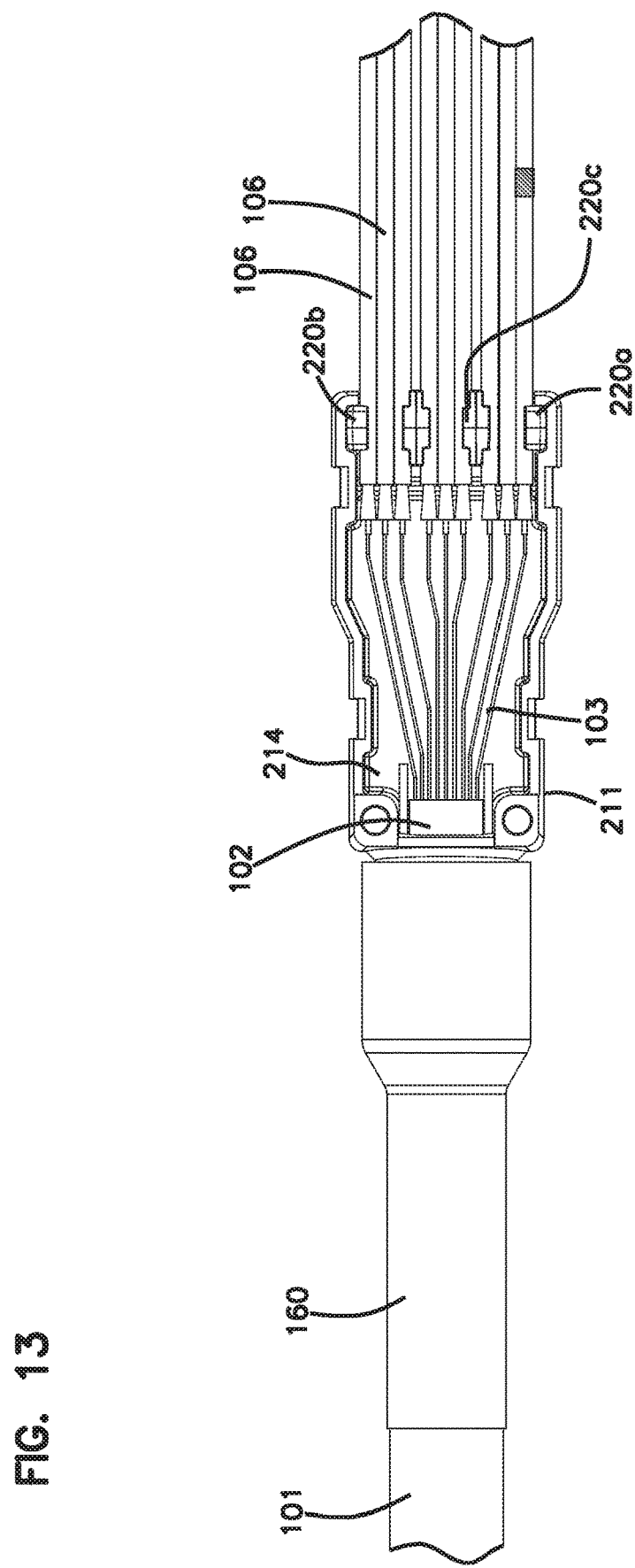
FIG. 13 is a top plan view of the portion of the second cable fanout arrangement of FIG. 12.

When a smaller number of sheaths 106 needs to be accommodated, a spacer 228 is positioned between the first and second sheath organizers 220a, 220b (e.g., see FIG. 9). The spacer 228 includes a wall 229 that blocks access to the fanout body interior 214 through the spacer 228. When a larger number of sheaths 106 needs to be accommodated, a third sheath organizer 220c is positioned between the first and second sheath organizers 220a, 220b (e.g., see FIG. 11). The third sheath organizer 220c holds a third plurality of sheaths 106.

In certain implementations, the organizer arrangement is configured to be held at an axially fixed position relative to the fanout body 210. In certain examples, the fanout body 210 defines recesses 216a into which one or more of the sheath organizers 220 extend. In the example shown, each sidewall of the fanout body 210 defines a recess 216 in which a portion 225 of a respective sheath organizer 220 extends. An example sheath organizer 220 may define notches 226 at opposite ends to define the portion 225. Similarly, the fanout body 110 defines a recess 116 in which portions of the sheath organizers 120 extend (e.g., see FIG. 3). In certain examples, the organizer arrangement is disposed between a lip 213a at the second end 213 of the fanout body 210 and a stop member 216b recessed within the fanout body 210 from the second end 213. In an example, each of the sheath organizers 220, 220a, 220b, 220c and the spacer 228 define notches 224 at the front to accommodate the lip 213a.

In certain implementations, each of the sheath organizers 220, 220a, 220b, 220c and spacer 228 includes opposite sidewalls connected by a bottom wall 224. When the organization arrangement is disposed within the fanout body 210, outer sidewalls 222 of the first and second sheath organizers 220a, 220b contact an inner surface of the fanout body 210. Inner sidewalls 221 of the first and second sheath organizers 220a, 220b contact the sidewalls of the spacer 228 or of the third sheath organizer 220c.

The sidewalls or the sheath organizers 220, 220a, 220b, 220c define channels, slots, or other recesses 227 to aid in positioning the sheaths 106 within the organizer. In certain examples, one of the sidewalls 221 of the sheath organizer 220, 220a, 220b is deeper than the other 222 so that the shallower sidewall 222 fits within the recess 216a and the deeper sidewall 221 does not fit within the recess 216a. In certain examples, the third sheath organizer 220c and the spacer 228 have sidewalls of equal depth. In certain examples, the sidewalls of the third sheath organizer 220c and the spacer 228 are substantially the same depth as the deeper sidewalls 221 of the first and second sheath organizers 220a, 220b. In certain examples, the sidewalls of the organizers 220 and spacer 228 are sufficiently deep to inhibit torqueing of the organizers 220 and spacer 228 after assembly.

In use, a user fans out a cable 101 using the cable fanout arrangement 200 by removing a portion of the cable jacket 102 from the cable 101 to expose a plurality of optical fibers 103. The user may need to also remove a portion of an inner tube to expose the fibers 103. The user separates the optical fibers 103. The fibers 103 may be individually separated or separated into separate ribbons or separate loose groups. The optical fibers 103 are threaded through sheaths 106 to upjacket the optical fibers 103. In some examples, two or more fibers 103 (e.g., a fiber ribbon) can be threaded into a single sheath 106.

The sheaths 106 are loaded into the sheath organizers 220. In some examples, the sheaths 106 are affixed to each other and/or to the sheath organizers 220 to hold the sheaths 106 in position during assembly. In certain examples, this adhesive, which only contacts the sheaths 106 and/or sheath organizer 2220, is not sufficient to withstand a pull-out force required for normal operation.

In certain implementations, the sheath organizers 220 are positioned external of the fanout body 210 to facilitate arranging the sheaths 106 at the sheath organizer 220. In certain examples, the first sheath organizer 220a can be positioned at a first workstation and the second sheath organizer 220b can be positioned at a second workstation. Accordingly, a first user can arrange a first plurality of the sheaths 106 at the first sheath organizer 220a at the first workstation while a second user can arrange a second plurality of the sheaths 106 at the second sheath organizer 220b at the second workstation. In certain examples, the third sheath organizer 220c can be loaded with sheaths 106 by a third worker at a third workstation. Such simultaneous assembly increases speed and efficiency in assembling the fanout arrangement 200. When the sheath organizers 220 are loaded, each sheath organizer 220 and the respective sheaths 106 are moved into the fanout body 210 as a unit.

Figure 14:
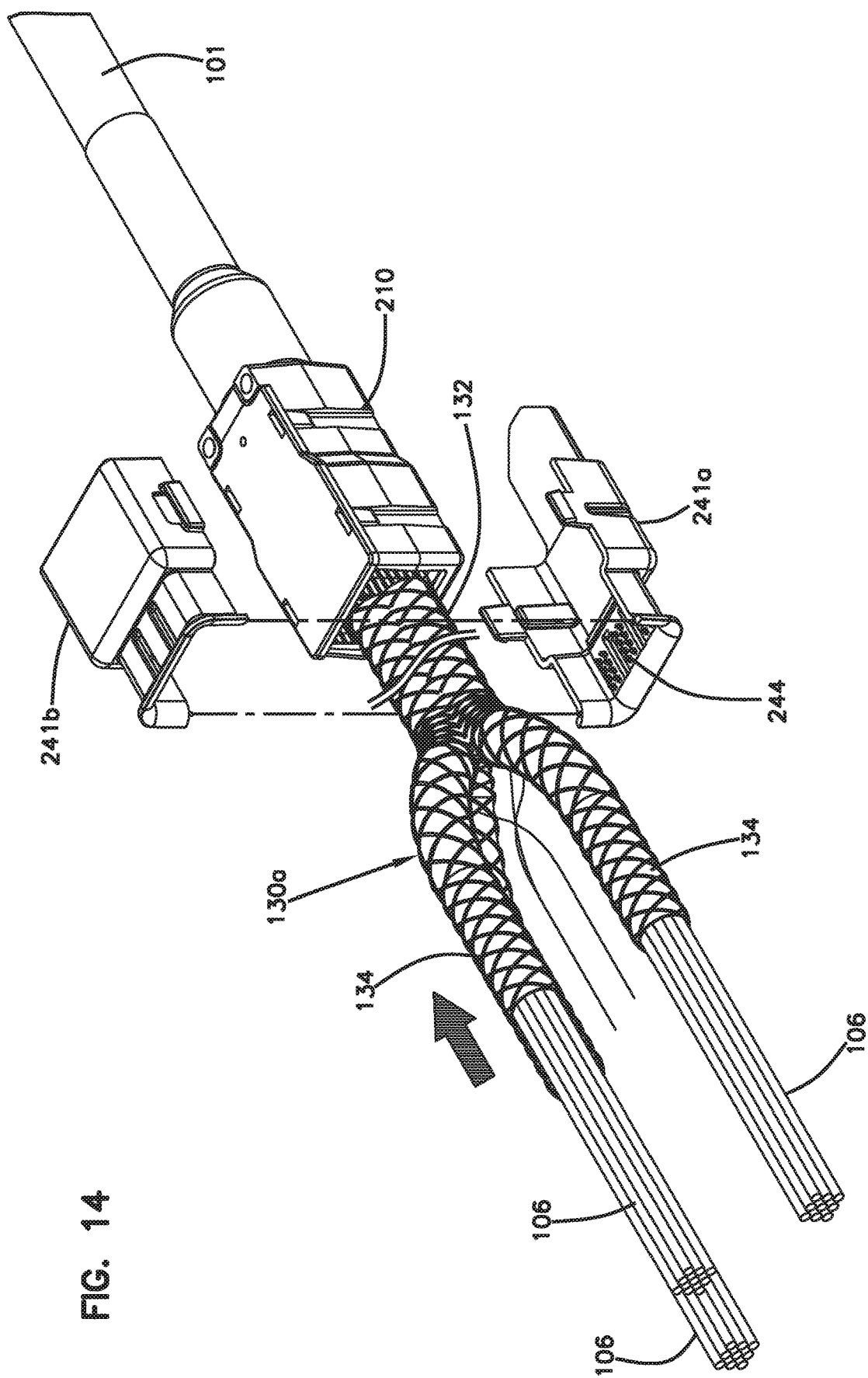
FIG. 14 shows a first mesh sleeve arrangement disposed at the second end of the fanout body and components of the sleeve retainer arrangement exploded away from the fanout body of the second cable fanout arrangement of FIG. 10.

As shown in FIG. 14, a single mesh sleeve 130a may be disposed over all of the sheaths 106 exiting the fanout body 210. The single mesh sleeve 130a may have a first end 132 defining a single opening through which the sheaths 106 enter the mesh sleeve 130a. In the example shown, the sleeve retainer arrangement 240 engages the first end 132 of the mesh sleeve 130a. In certain examples, the single mesh sleeve 130a may split into multiple second sections 134 to enable separate routing of at least some of the sheaths 106 away from the fanout body 210. In an example, the single mesh sleeve 130a can be used when all three sheath organizers 220a, 220b, 220c are utilized.

Figure 15:
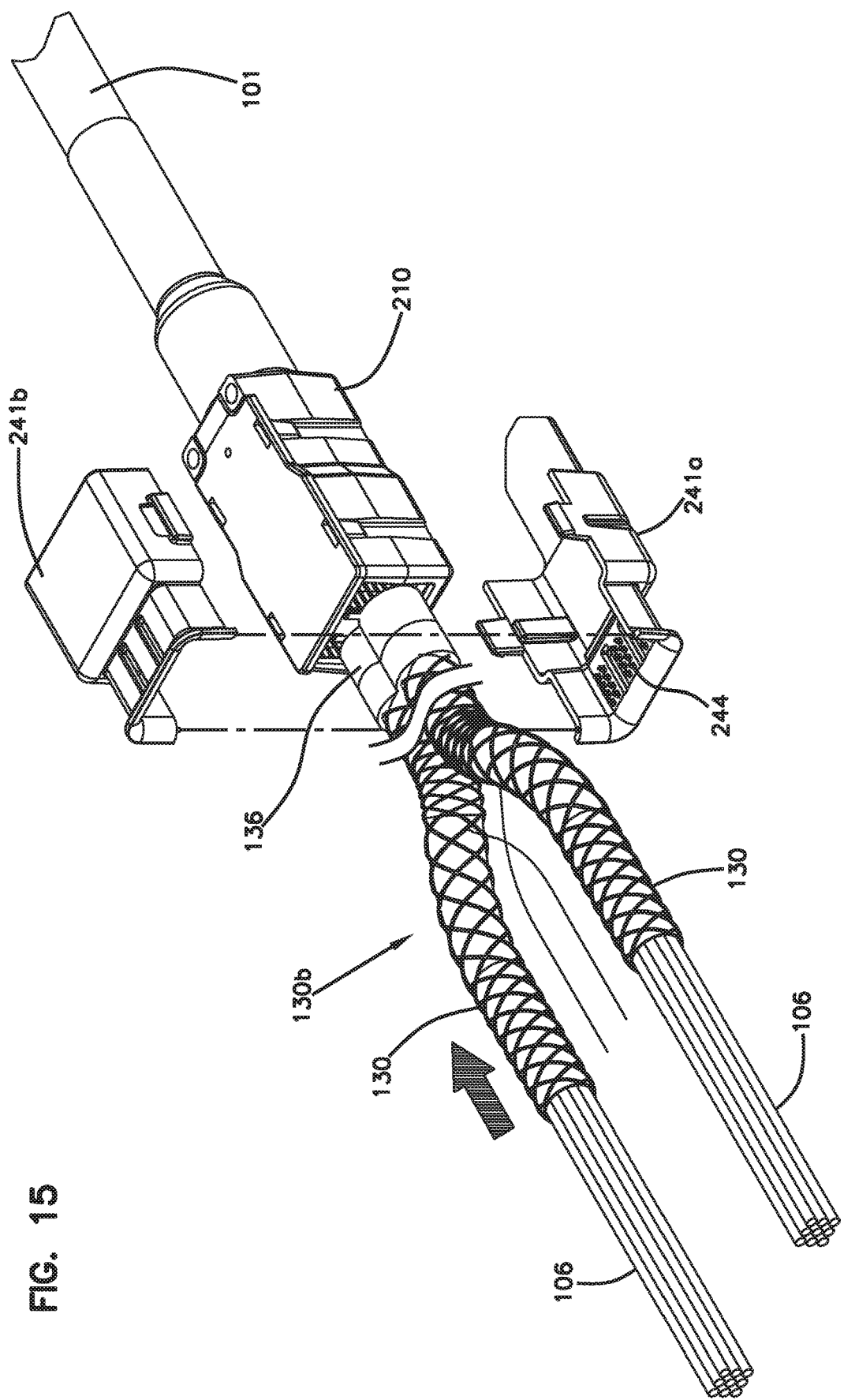
FIG. 15 shows a second mesh sleeve arrangement disposed at the second end of the fanout body and components of the sleeve retainer arrangement exploded away from the fanout body of the second cable fanout arrangement of FIG. 10.

As shown in FIG. 15, the sheaths 106 can be routed through a mesh sleeve arrangement 130b including multiple mesh sleeves 130. In certain examples, the mesh sleeves 130 can be taped (see 136) or otherwise held together at the second end 213 of the fanout housing 210. The sleeve retainer arrangement 240 can either engage the individual mesh sleeves 130 or can engage the taped together portion of the mesh sleeve arrangement 130b. In the example shown, the mesh sleeve arrangement 130b is used when the spacer 228 is disposed between the sheath organizers 220a, 220b. Each mesh sleeve 130 aligns with one of the sheath organizers 220a, 220b. In other examples, a single mesh sleeve 130, 130a could be utilized.

Figure 16:
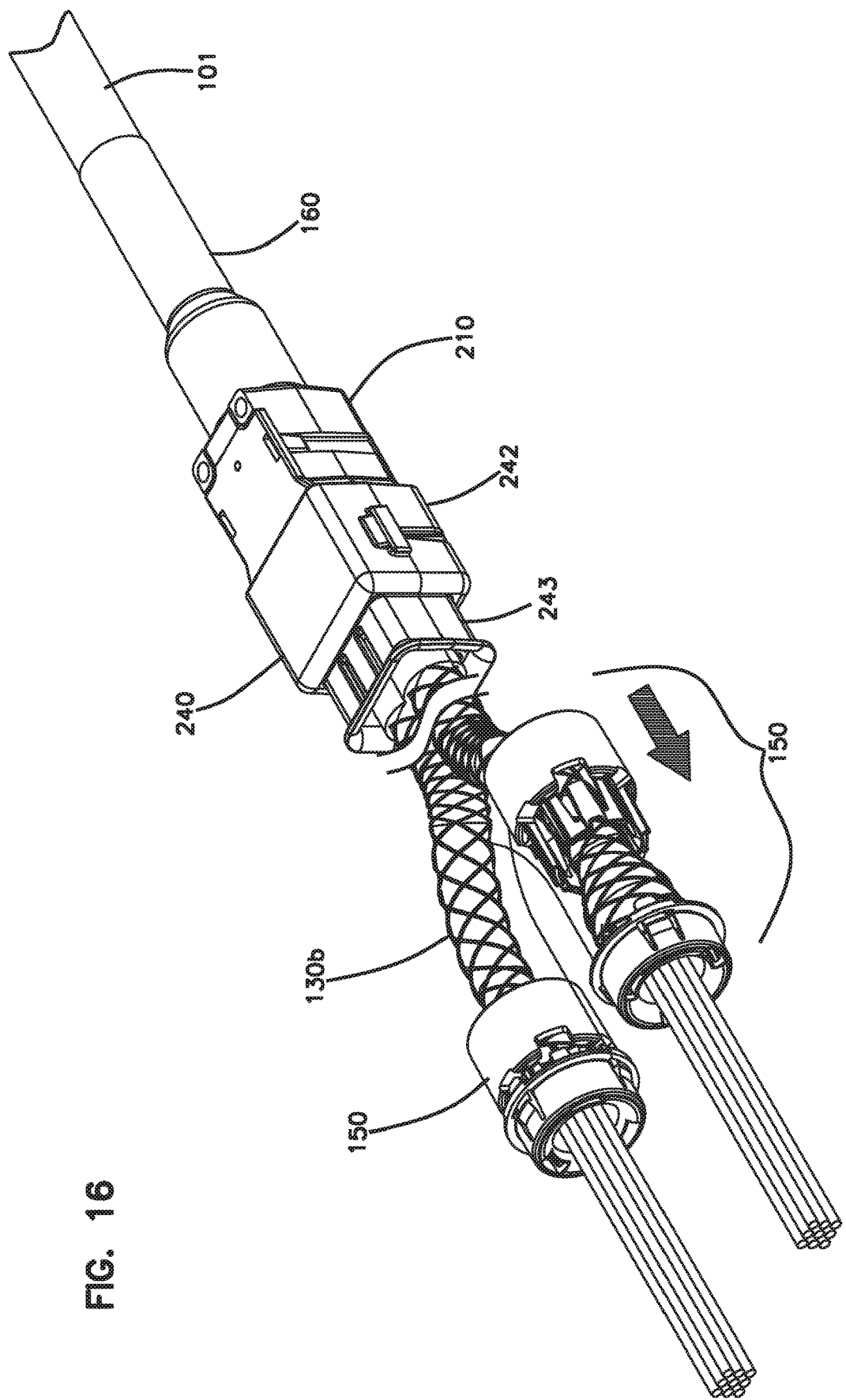
FIG. 16 shows cable clamps mounted to the distal ends of the mesh sleeve arrangement.
Figure 17:
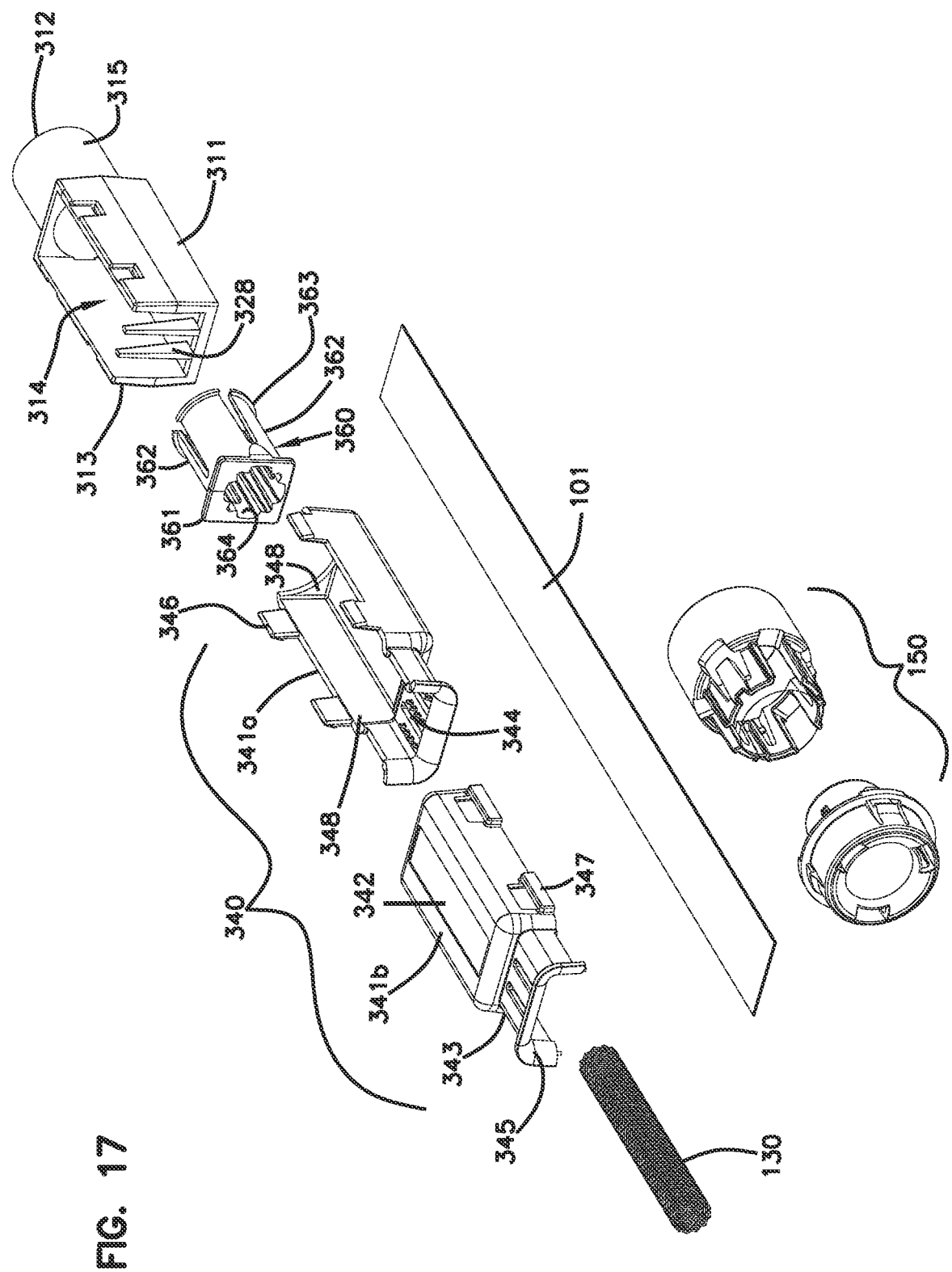
FIG. 17 is a perspective view of a third example cable fanout arrangement suitable for use in fanning out an optical cable, such as the optical cable of FIG. 1, where the components of the third cable fanout arrangement are exploded away from each other for ease in viewing.
Figure 18:
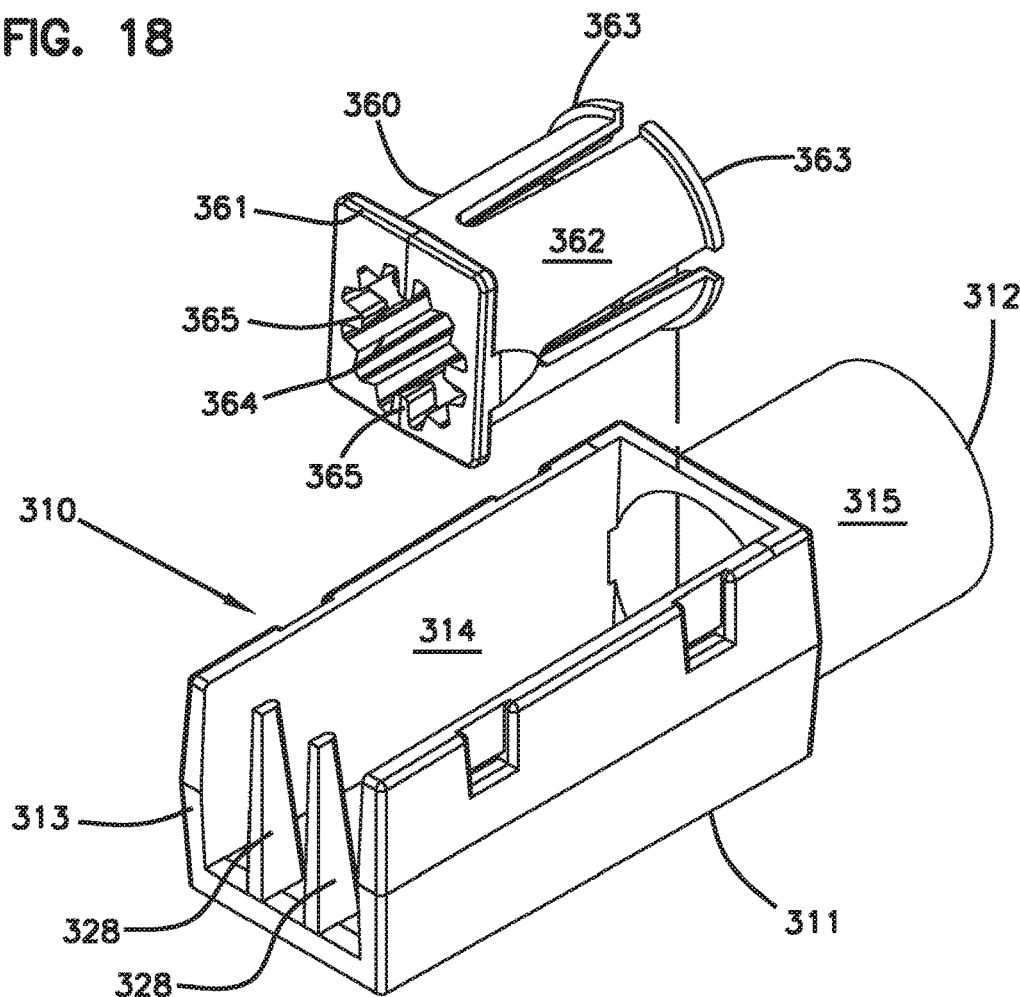
FIG. 18 is a perspective view of a fanout body and anchor insert of the cable fanout arrangement of FIG. 17.
Figure 19:
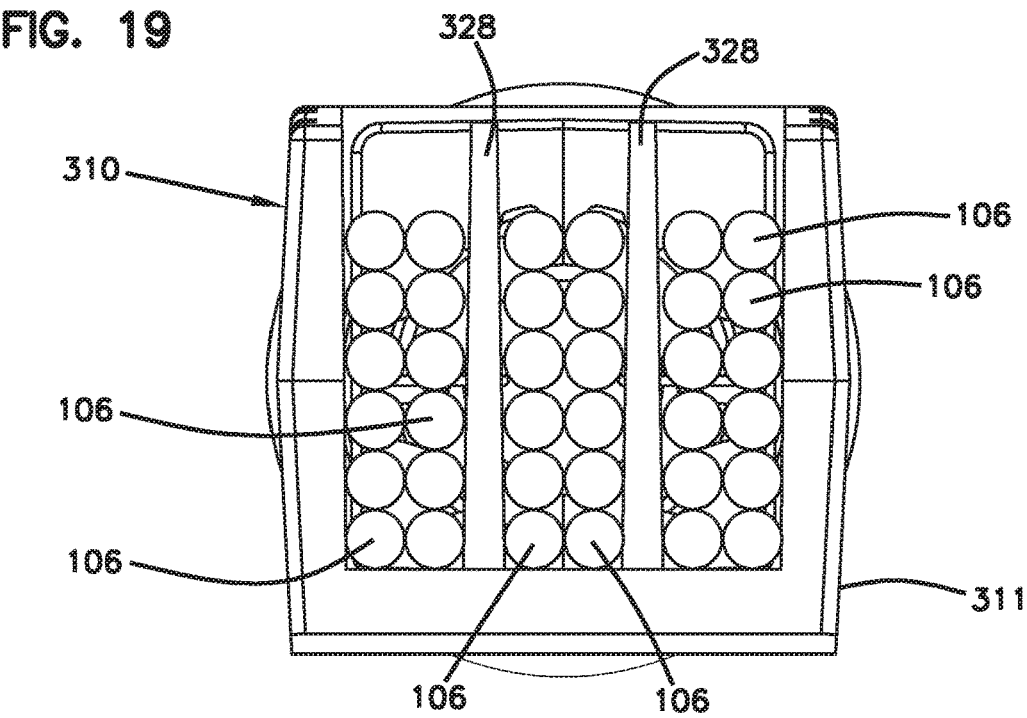
FIG. 19 is a front elevational view of the loaded fanout body of the third cable fanout arrangement of FIG. 18.

As shown in FIG. 16, one or more clamp arrangements 150 can be mounted to the opposite end(s) of the mesh sleeve 130, 130a, 130b. For example, a clamp arrangement 150 could be mounted to the end of one or more of the second sections 134. In another example, a clamp arrangement 150 can be mounted to the opposite end of one or more mesh sleeves 130 of the mesh sleeve arrangement 130b (see FIG. 16).

FIGS. 17-20 illustrate a third example fanout arrangement 300 suitable for use in fanning out a cable 101. The third fanout arrangement 300 does not include a removable sheath organizer. Rather, the fanout arrangement 300 includes a fanout body 310 with an integral sheath organizer. For example, the fanout body 310 may include one or more dividers 328 that extend upwardly at the second end 313 of the fanout body 310. The sheaths 106 are routed through gaps between the dividers 328 (see FIG. 19). In some examples, the sheaths 106 are potted within an interior 314 of the fanout body 310 to hold the sheaths 106 at the fanout body 310. In other examples, the interior 314 of the fanout body 310 can be closed with a cover.

In certain implementations, an anchor insert 360 is disposed within the fanout body 310 to aid in holding the fanout body 310 relative to the cable 101. The anchor insert 360 includes a flange 361 sized to fit within the fanout body interior 314, but not through the tubular sleeve 315. The anchor insert 360 also includes flexible arms 362 sized to fit within the tubular sleeve 315. Each of the flexible arms 362 includes a lip 363 or other lock member at a distal end. The anchor insert 360 defines a passage 364 through which the jacketed portion of the cable 101 extends. In certain examples, one or more teeth 365 or other retention members extend inwardly from the passage 364 to engage the cable 101.

The flexible arms 362 are sized so that the flexible arms 362 can be slid through the tubular sleeve 315 from the fanout body interior 314 to the first end 312 of the fanout body 310. When the flange 361 abuts an interior wall of the fanout body 310, the lips 363 of the flexible arms 362 snap-fit over an exterior edge of the tubular sleeve 315 at the first end 312 of the fanout body 310. The flange 361 inhibits further axial movement of the anchor insert 360 relative to the fanout body 310 in a first direction. Engagement between the lips 363 and the first end 312 of the fanout body 310 inhibits further axial movement of the anchor insert 360 relative to the fanout body 310 in an opposite second direction.

Figure 20:
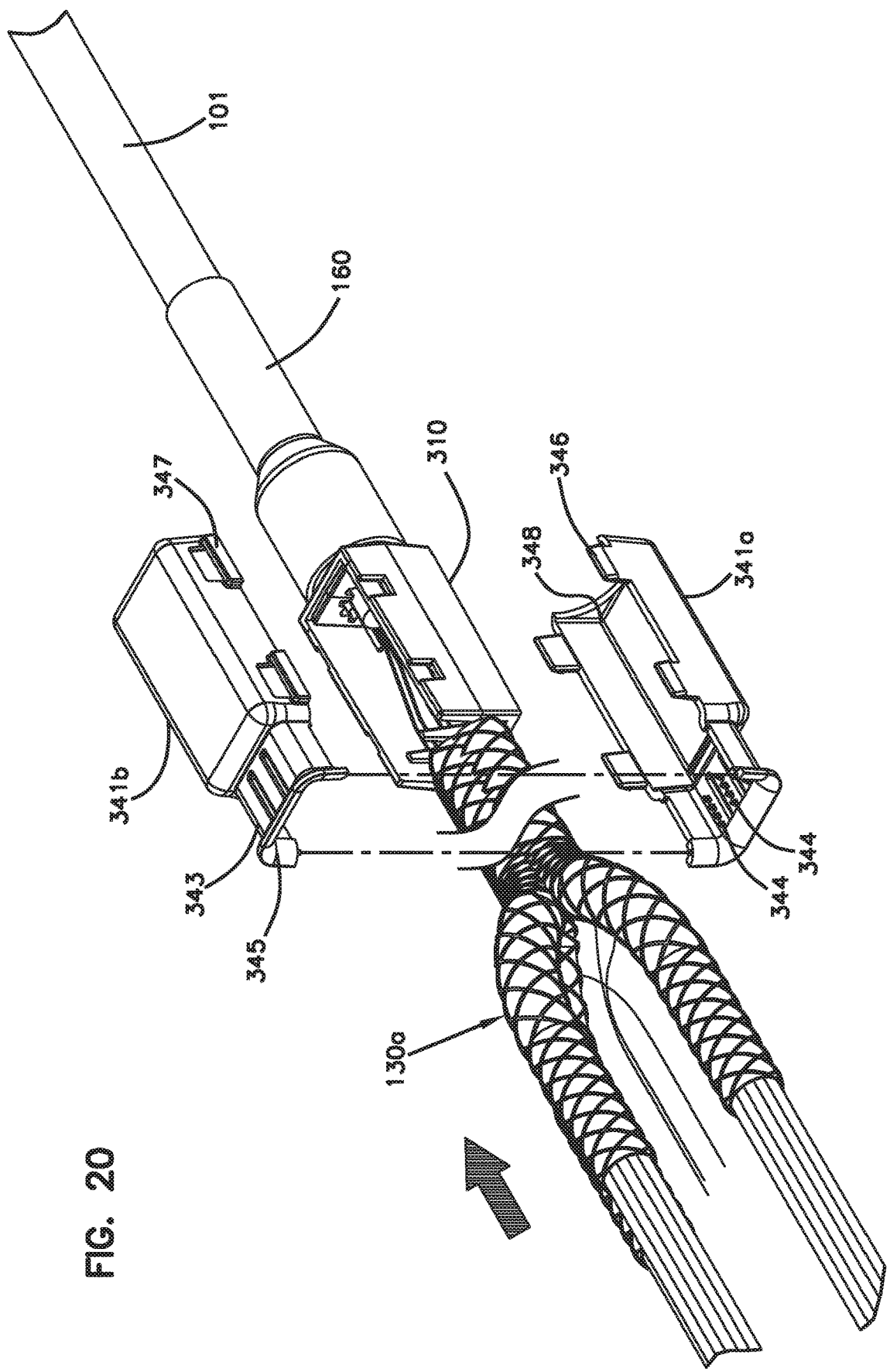
FIG. 20 shows a mesh sleeve arrangement disposed at the second end of the fanout body and components of the sleeve retainer arrangement exploded away from the fanout body of the third cable fanout arrangement of FIG. 17.

As shown in FIG. 20, a single mesh sleeve 130, 130a may be disposed at the second end 313 of the fanout body 310 to receive the sheaths 106. In other examples, the number of mesh sleeves 130 may correspond to the number of sheath groups formed by the dividers 328. The mesh sleeves 130, 130a, 130b may be coupled to the fanout body 310 using either a sleeve retainer arrangement 340 or a shrinkable tube arrangement.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A fanout arrangement comprising:
a fanout body extending along a length between a first end and a second end and along a width between a first side and a second side, the fanout body defining an interior, the first end being configured to receive a cable;
a cable routed to the first end of the fanout body, the cable including a plurality of optical fibers;
a first organizer disposed at the second end of the fanout body, the first organizer being removable from the fanout body, the first organizer being configured to hold a first plurality of sheaths;
a first plurality of sheaths extending outwardly from the first organizer at the second end of the fanout body, each of the sheaths of the first plurality receiving at least one of the optical fibers of the cable;
a second organizer disposed at the second end of the fanout body, the second organizer being removable from the fanout body, the second organizer being configured to hold a second plurality of sheaths, the second organizer being offset along the width of the fanout body from the first organizer;
a second plurality of sheaths extending outwardly from the second organizer at the second end of the fanout body, each of the sheaths of the second plurality receiving at least one of the optical fibers of the cable;
a mesh sleeve defining an interior passage extending between first and second ends of the mesh sleeve, wherein the sheaths of at least the first plurality of sheaths extend through the interior passage; and
a retention arrangement disposed about the fanout body, the retention arrangement being configured to hold the mesh sleeve to the fanout body.

2. The fanout arrangement of claim 1, wherein the second organizer is spaced along the width from the first organizer.

3. The fanout arrangement of claim 2, further comprising a third organizer disposed between the first and second organizers, the third organizer being removable from the fanout body, the third organizer being configured to hold a third plurality of sheaths.

4. The fanout arrangement of claim 2, further comprising a spacer disposed between the first and second organizers, the spacer being removable from the fanout body, the spacer including a wall extending between the first and second organizers to partially block access to the interior of the fanout body through the second end of the fanout body.

5. The fanout arrangement of claim 1, wherein each of the organizers defines a column of recessed channels at which the sheaths are disposed.

6. The fanout arrangement of claim 1, wherein the fanout body includes a retention arrangement recessed inwardly from the second end of the fanout body, wherein the first and second organizers are disposed between the second end of the fanout body and the retention arrangement.

7. The fanout arrangement of claim 6, wherein the second end of the fanout body defines a lip, wherein the first and second organizers are axially held between the lip and the retention arrangement.

8. The fanout arrangement of claim 6, wherein the retention arrangement includes a stop member extending laterally between the first and second sides of the fanout body.

9. The fanout arrangement of claim 1, wherein the fanout body defines a first recess in the first side and a second recess in the second side at the second end, wherein the first organizer extends into the first recess and the second organizer extends into the second recess.

10. The fanout arrangement of claim 9, wherein the fanout body includes a base and a cover that cooperate to define the interior, the base including a stop member and the first and second recesses.

11. The fanout arrangement of claim 1, wherein each sheath of the first and second plurality of sheaths receives a fiber ribbon including a plurality of the optical fibers of the cable.

12. The fanout arrangement of claim 1, wherein the second plurality of the sheaths extend through the mesh sleeve.

13. The fanout arrangement of claim 1, wherein the mesh sleeve is one of a plurality of mesh sleeves, each of the mesh sleeves receiving at least some of the sheaths extending from the second end of the fanout body.

14. The fanout arrangement of claim 1, wherein the retention arrangement includes a plurality of teeth that engage the mesh sleeve.

15. The fanout arrangement of claim 1, wherein the retention arrangement includes a first housing piece and a second housing piece that couple together to mount about the fanout body.

16. The fanout arrangement of claim 15, wherein the first housing piece latches to the second housing piece.

17. The fanout arrangement of claim 1, wherein the retention arrangement is shaped to engage the fanout body to hold the retention arrangement at a fixed location along the length of the fanout body.

18. The fanout arrangement of claim 1, wherein the retention arrangement defines a curved surface to protect the mesh sleeve during flexing/bending movement of the mesh sleeve relative to the fanout body.

19. A fanout arrangement comprising:
- a fanout body extending along a length between a first end and a second end and along a width between a first side and a second side, the fanout body defining an interior, the first end being configured to receive a cable;
- a first organizer disposed at the second end of the fanout body, the first organizer being removable from the fanout body, the first organizer being configured to hold a first plurality of sheaths;
- a second organizer disposed at the second end of the fanout body and spaced along the width from the first organizer, the second organizer being removable from the fanout body, the second organizer being configured to hold a second plurality of sheaths, the second organizer being offset along the width of the fanout body from the first organizer; and
- a spacer disposed between the first and second organizers, the spacer being removable from the fanout body, the spacer including a wall extending between the first and second organizers to partially block access to the interior of the fanout body through the second end of the fanout body.

\* \* \* \* \*